(12) United States Patent
Bonny

(10) Patent No.: US 10,670,051 B1
(45) Date of Patent: Jun. 2, 2020

(54) HYDRAULIC PUMP ASSEMBLY

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 7 days.

(21) Appl. No.: 16/198,123

(22) Filed: Nov. 21, 2018

Related U.S. Application Data

(63) Continuation of application No. 15/357,817, filed on Nov. 21, 2016, now Pat. No. 10,138,910, which is a continuation of application No. 14/792,007, filed on Jul. 6, 2015, now Pat. No. 9,695,844, which is a continuation of application No. 13/480,134, filed on May 24, 2012, now Pat. No. 9,074,670.

(60) Provisional application No. 61/553,381, filed on Oct. 31, 2011, provisional application No. 61/514,727, filed on Aug. 3, 2011, provisional application No. 61/490,994, filed on May 27, 2011.

(51) Int. Cl.
| | |
|---|---|
| *F15B 11/16* | (2006.01) |
| *F04B 23/14* | (2006.01) |
| *E02F 9/22* | (2006.01) |
| *F16H 61/44* | (2006.01) |
| *F16H 61/4078* | (2010.01) |
| *F16H 61/4139* | (2010.01) |
| *F04B 23/10* | (2006.01) |
| *F16H 61/40* | (2010.01) |
| *F15B 13/02* | (2006.01) |
| *F04B 19/22* | (2006.01) |
| *F04B 23/12* | (2006.01) |
| *F15B 15/06* | (2006.01) |
| *F04C 2/10* | (2006.01) |
| *F15B 11/17* | (2006.01) |
| *F16H 39/14* | (2006.01) |
| *B62D 5/12* | (2006.01) |

(52) U.S. Cl.
CPC ............ *F15B 11/161* (2013.01); *E02F 9/225* (2013.01); *E02F 9/2267* (2013.01); *F04B 19/22* (2013.01); *F04B 23/106* (2013.01); *F04B 23/12* (2013.01); *F04B 23/14* (2013.01); *F04C 2/103* (2013.01); *F15B 11/17* (2013.01); *F15B 13/024* (2013.01); *F15B 15/06* (2013.01); *F16H 39/14* (2013.01); *F16H 61/40* (2013.01); *F16H 61/4078* (2013.01); *F16H 61/4139* (2013.01); *F16H 61/44* (2013.01); *B62D 5/12* (2013.01)

(58) Field of Classification Search
CPC .................................. F16H 39/14; F16H 61/40
USPC ........................................... 60/486, 487, 488
See application file for complete search history.

(56) References Cited

U.S. PATENT DOCUMENTS

| | | |
|---|---|---|
| 2,988,889 A | 6/1961 | Bookout et al. |
| 7,137,250 B1 | 11/2006 | McCoy et al. |
| 7,150,693 B2 * | 12/2006 | Ishimaru .............. B60K 17/105 475/206 |

(Continued)

*Primary Examiner* — Thomas E Lazo
(74) *Attorney, Agent, or Firm* — Neal, Gerber & Eisenberg LLP

(57) ABSTRACT

A hydraulic pump assembly having a main pump, a charge pump and an auxiliary pump driven by a single shaft is provided. A pair of hydraulic porting members cooperates to feed and distribute hydraulic fluid between the three pump units, and a single inlet may be used to provide hydraulic fluid to the charge pump and the auxiliary pump.

15 Claims, 37 Drawing Sheets

(56) References Cited

U.S. PATENT DOCUMENTS

| | | | | |
|---|---|---|---|---|
| 7,257,948 B1* | 8/2007 | Bennett | ............... | F04B 23/06 |
| | | | | 60/486 |
| 9,074,670 B1* | 7/2015 | Bonny | ............... | F16H 39/14 |
| 9,695,844 B1* | 7/2017 | Bonny | ............... | F16H 39/14 |
| 10,138,910 B1* | 11/2018 | Bonny | ............... | F16H 39/14 |
| 2005/0254970 A1* | 11/2005 | Mayer | ............... | F04C 2/086 |
| | | | | 417/410.4 |

* cited by examiner

HYDRAULIC PUMP ASSEMBLY

CROSS-REFERENCE

This application is a continuation of U.S. patent application Ser. No. 15/357,817, filed on Nov. 21, 2016, which is a continuation of U.S. patent application Ser. No. 14/792,007, filed on Jul. 6, 2015, now U.S. Pat. No. 9,695,844, which is a continuation of U.S. patent application Ser. No. 13/480, 134, filed on May 24, 2012, now U.S. Pat. No. 9,074,670, which claims the benefit of U.S. Provisional Application No. 61/553,381, filed on Oct. 31, 2011; U.S. Provisional Application No. 61/514,727, filed on Aug. 3, 2011; and U.S. Provisional Application No. 61/490,994, filed on May 27, 2011. The disclosures of all of these prior applications are incorporated herein by reference.

BACKGROUND OF THE INVENTION

This application relates to pump assemblies generally and, in particular, to hydraulic pump assemblies intended for use in driving a vehicle or utility transport, such as a riding mower, that require greater pump capacity for auxiliary functions such as power steering.

SUMMARY OF THE INVENTION

An improved hydraulic pump assembly having a plurality of pumps used for different applications, yet disposed in a compact in-line arrangement, is disclosed herein. A hydraulic pump assembly having an auxiliary pump in the form of a fixed displacement, axial piston pump suitable for high flow applications is provided. A single shaft drives a main, variable speed axial piston pump used as a propulsion pump for the vehicle, an associated gerotor charge pump, and the axial piston auxiliary pump. A pair of port blocks, or end caps, cooperates to feed and distribute hydraulic fluid between the three pump units and external hydraulic devices to provide, for example, a source of propulsive fluid to a hydraulic wheel motor and an auxiliary unit such as a power steering unit, a debris collection unit, or the like. The present invention improves the auxiliary pump capacity over that of more conventional auxiliary gear pumps.

The disclosed arrangement places all three of these pumps in a compact in-line arrangement that allows all three different pumps to be powered by a single input shaft. Prior art designs such as commonly owned U.S. Pat. No. 7,257, 948 use a pair of propulsion pumps but do not provide for a single propulsion pump in-line with both an auxiliary pump and a charge pump to provide additional charge fluid to the system. A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
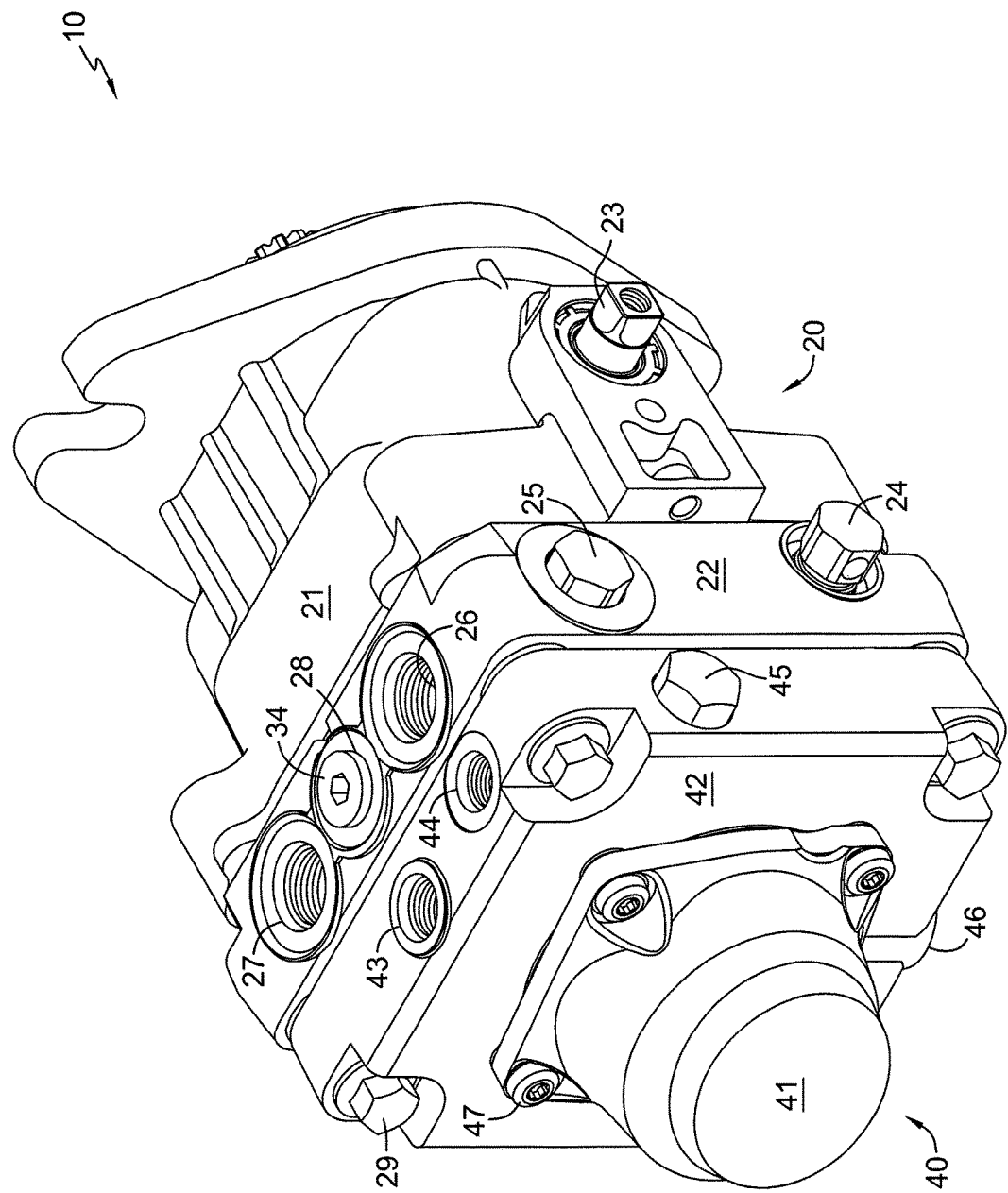
FIG. 1 is an isometric view of a first representative hydraulic pump assembly.
Figure 2:
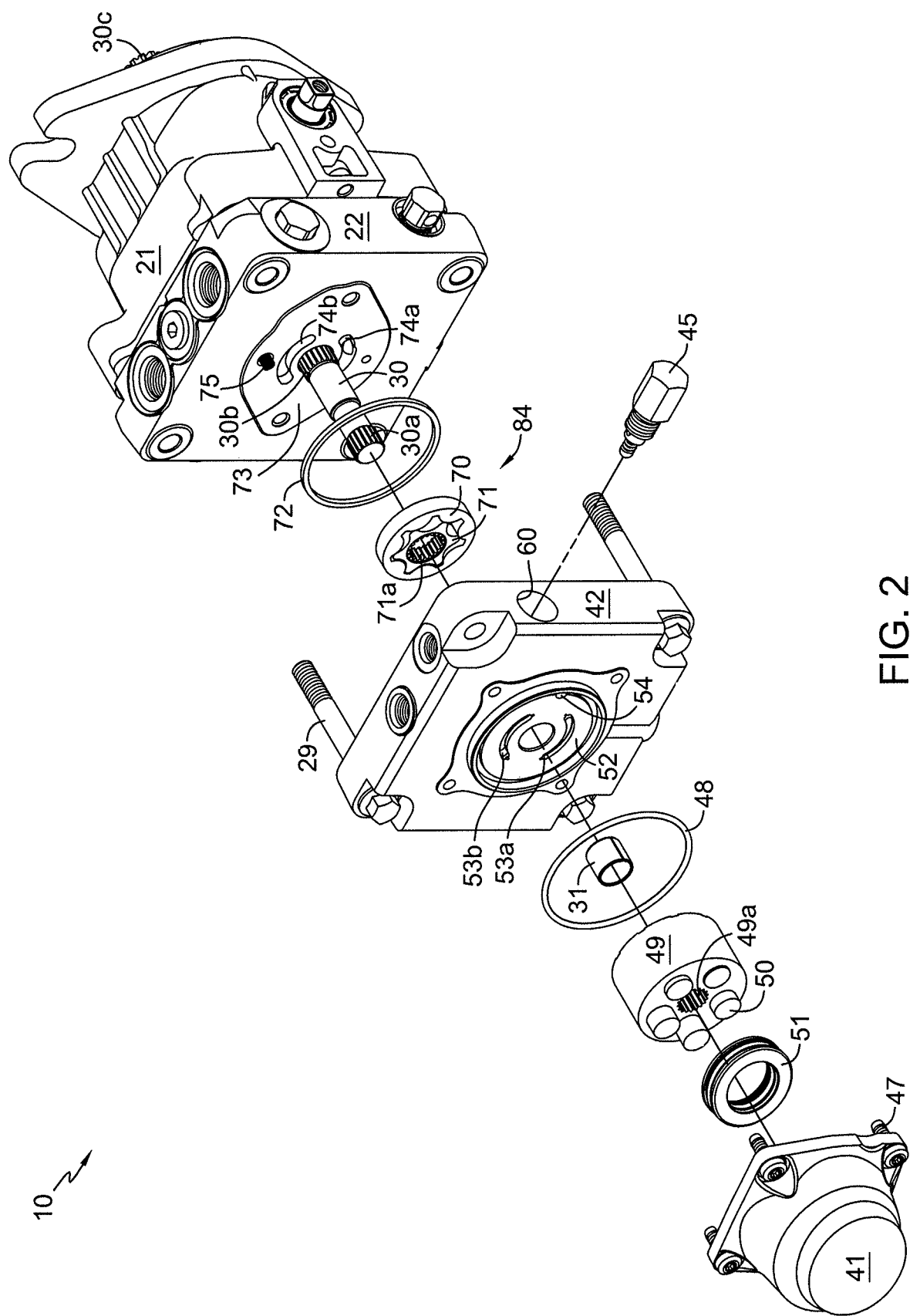
FIG. 2 is an exploded, isometric view of the hydraulic pump assembly of FIG. 1.
Figure 3:
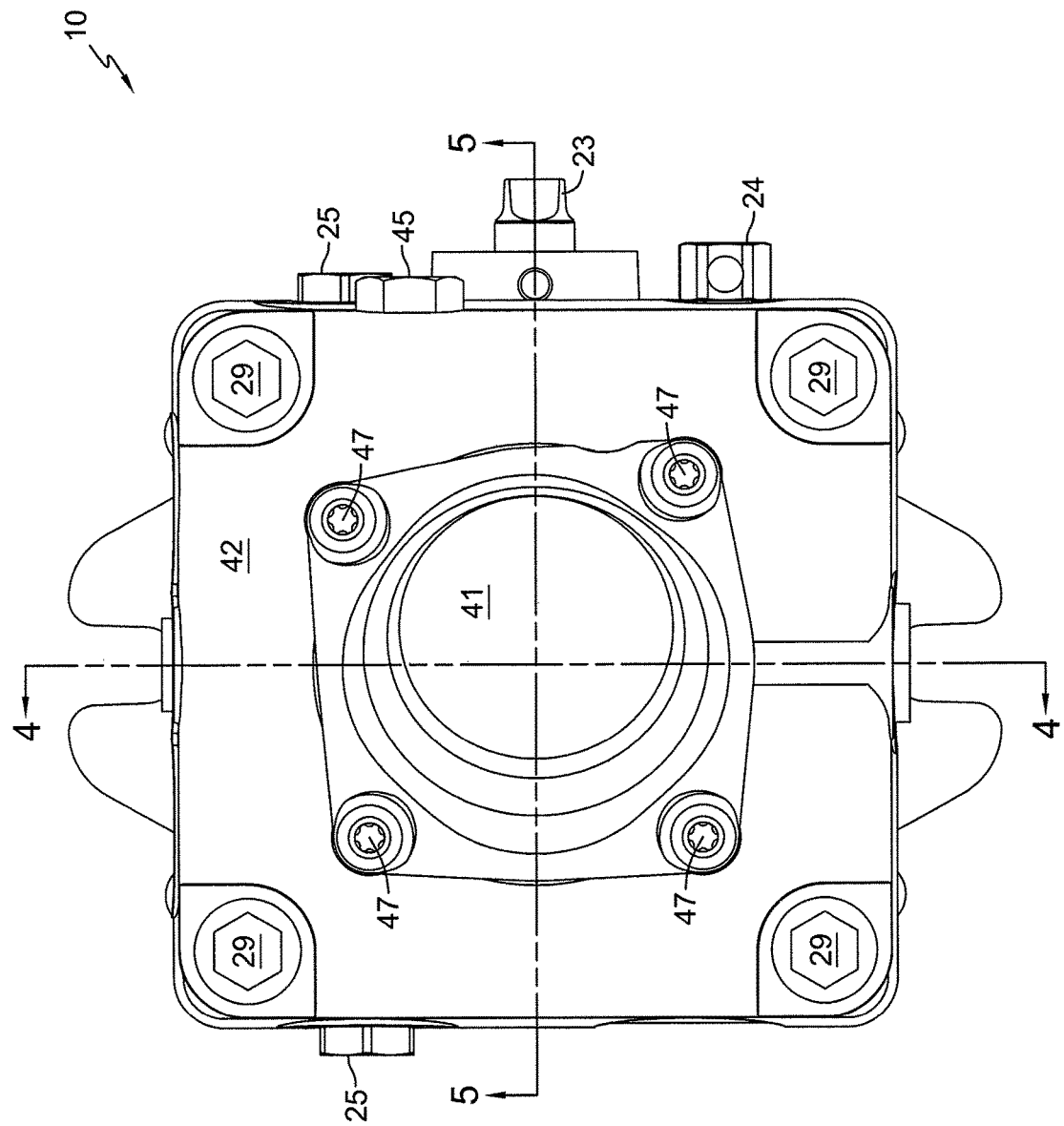
FIG. 3 is a top view of the hydraulic pump assembly of FIG. 1.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. For example, the auxiliary pump end caps in the various embodiments disclosed herein are serially numbered as 42, 142, 242, 342, 442, 542, 642, 742, 842 and 942 respectively, to ease recognition. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art.

The description that follows illustrates representative hydraulic pump assemblies in accordance with the principles of the invention. In each, a unique embodiment of an axial piston auxiliary pump is mated to a standardized configuration of a main, axial piston pump and an associated gerotor charge pump. The design, layout and function of the main, axial piston pump and its end cap porting can be substantially similar to that illustrated in U.S. Pat. No. 6,332,393, the disclosure of which is incorporated herein by reference in its entirety, and as such, will not be described in detail. Differences in the design, where important to an understanding of the present invention, will be addressed herein. Other variable speed hydraulic pumps known in the art are contemplated within the scope of the invention.

FIGS. 1-9 detail a representative hydraulic pump assembly 10 having an auxiliary pump 40 assembled to a main pump 20. In general, main pump 20 comprises a housing 21 that forms a sump 12 for the main, variable speed pump when sealed by main pump end cap 22. A rotating kit disposed in sump 12 comprises a cylinder block 17 having a set of pistons (not shown) that ride on a thrust bearing in a known manner. The displacement of the main pump 20, and the direction of fluid flow into and out of system ports 26 and 27, respectively, is controlled by rotation of a trunnion arm 23 engaged to a swash plate containing the thrust bearing. Pump shaft 30 is axially engaged to the main pump cylinder block 17 and extends from housing 21 at a first end. In a typical application, pump shaft 30 is driven by a prime mover (not shown), such as an internal combustion engine or electric motor, by means of a shaft coupled to the first end of pump shaft 30 or by means of a pulley and belt arrangement; in either case, the splines 30c at the first end of pump shaft 30 serve as the means of engagement.

Hydraulic pump assembly 10 further comprises a gerotor charge pump 84 engaged to pump shaft 30 and located between main pump end cap 22 and auxiliary pump end cap 42. Charge pump 84 comprises an inner gerotor element 71 having a spline 71a engaged to a corresponding spline 30b on pump shaft 30 to rotate therewith, and an outer gerotor element 70, both disposed on a running surface 73 formed on a face of main pump end cap 22. Running surface 73 is located on the opposite side of main pump end cap 22 from a running surface (not shown) upon which the main pump cylinder block is disposed. When the auxiliary pump end cap 42, main pump end cap 22 and main pump housing 21 are assembled as a unit by means of threaded fasteners 29 engaging threaded bores in main pump housing 21, an o-ring 72 seals the outer and inner gerotor elements, 70 and 71 respectively, within a pocket 16 formed in the auxiliary pump end cap 42 and closed off by main pump end cap 22. As described herein, main pump end cap 22 is sandwiched between main pump housing 21 and auxiliary pump end cap 42. Other means for joining housings and end caps known in the art, such as bolts and corresponding nuts, are contemplated within the scope of the invention. It is also understood that valve plates or the like may be used between the pumps and the running surfaces discussed herein.

The third primary component of hydraulic pump assembly 10 is the auxiliary pump 40 comprising a cylinder block 49 disposed within an auxiliary pump chamber 64 formed by the joining of an auxiliary pump housing 41 to auxiliary pump end cap 42, accomplished by means of threaded fasteners 47. More specifically, cylinder block 49 is rotatably disposed on an auxiliary pump running surface 52 formed on auxiliary pump end cap 42. Auxiliary pump running surface 52 is located on the opposite side of the auxiliary pump end cap 42 from the side having the gerotor charge pump pocket 16. Auxiliary pump chamber 64 is hydraulically sealed by an o-ring 48 that may have a corresponding locating feature on one or both of the auxiliary pump housing 41 and the auxiliary pump end cap 42. An axial spline 49a formed in cylinder block 49 engages a corresponding spline 30a on pump shaft 30 to rotate therewith. The cylinder block 49 receives a set of pistons 50 that ride on a thrust bearing 51 disposed at a fixed angle within auxiliary pump housing 41 based on engagement therein with an inclined surface 41*a*. The degree of incline corresponds to the amount of displacement produced by this fixed displacement, axial piston auxiliary pump 40. The displacement, depending on the application, can be set by the degree of incline formed within the auxiliary pump housing 41. The direction of hydraulic fluid flow, into auxiliary pump inlet port 46 and out of auxiliary pump outlet port 43, is unidirectional, being fixed by the orientation of the inclined surface 41*a* relative to the rotational direction of pump shaft 30. Pistons 50 remain engaged to thrust bearing 51 throughout their displacement cycle under the bias of piston springs 59.

Pump shaft 30 is rotatably supported within main pump housing 21 by a ball bearing (not shown), a first journal bearing 81 within the main pump end cap 22, and a second journal bearing 31 within the auxiliary pump end cap 42. It should be understood that the type of bearing utilized can be changed depending on the application or the duty cycle desired, replacing a journal bearing, for example, with a needle bearing.

The hydraulic porting formed within auxiliary pump end cap 42 and main pump end cap 22 cooperates to feed and distribute hydraulic fluid between the three pump units and any external hydraulic devices linked to the hydraulic pump assembly 10 in a hydraulic circuit (not shown). As shown in FIGS. 2 and 4-7, main pump end cap 22 provides the necessary porting for the main pump 20 and a portion of the necessary porting for the charge pump 84. Main pump arcuate ports 18*a* and 18*b*, respectively, on the main pump running surface (not shown) provide fluid communication between the main pump cylinder block and system ports 26 and 27, respectively, via system passages 35 and 36, respectively. System ports 26 and 27, representing the high and low pressure sides of main pump 20, are typically placed in fluid communication with an external hydraulic device, such as a wheel motor, via hydraulic lines (not shown). A bypass passage 37 links system passages 35 and 36 to permit, for example, movement of a temporarily disabled vehicle. Bypass passage 37 is normally closed to fluid communication between system passages 35 and 36 by a bypass valve 24 located in bypass port 90, permitting normal operation of the main pump 20. Main pump end cap 22 varies from that illustrated in U.S. Pat. No. 6,332,393 in two regards not affecting the function described therein. First, the bypass port 90 is oriented perpendicular to system passages 35 and 36, as opposed to parallel therewith. Secondly, main pump end cap 22 only provides a single drain port 38, as opposed to a pair of drain ports on opposing sides of the end cap. Here, drain port 38 connects to drain passage 39, providing a pathway from the sump 12 for main pump 20 to an external location, such as a reservoir used for cooling.

Main pump end cap 22 further contains a pair of combination check/relief valves 25 that function to route make-up fluid, as necessary, from a charge gallery 76 to either of the system passages 35 and 36 then serving as the low pressure side of main pump 20; and also to provide pressure relief from the high pressure side of main pump 20 at a predetermined set point. The structure and function of valves 25 may be in accordance with the teachings of commonly owned U.S. Pat. No. 6,719,005, the disclosure of which is incorporated by reference herein, and shall not be further described.

Main pump end cap 22 further comprises a pair of charge pump arcuate ports, 74*a* and 74*b*, on charge pump running surface 73. Charge pump arcuate port 74*a*, an inlet port, is connected via inlet passage 32 to main pump inlet port 83 on the exterior of main pump end cap 22. Typically, main pump inlet port 83 would be placed in fluid communication with a return line from an external reservoir or oil cooler. With respect to hydraulic pump assembly 10, however, a threaded inlet port plug 33 closes off main pump inlet port 83. As will be described in greater detail below, charge pump 84 is fed from the inlet port 46 of auxiliary pump end cap 42. Charge pump arcuate port 74*b*, an outlet port, provides pressurized hydraulic fluid to charge gallery 76 via a pair of connecting charge passages 86. The charge gallery 76 is sealed by diagnostic port plug 34 in diagnostic port 28. Charge gallery 76 also possesses a bleed passage 80 leading to the sump (not shown) of main pump 20 to aid cooling of the hydraulic fluid. A charge pump relief valve 75, located in charge relief passage 77, comprises a simple ball 75*a* and spring 75*b* construction retained between the valve seat 77*a* in charge relief passage 77 and auxiliary pump end cap 42. Charge pump relief valve 75 relieves hydraulic fluid to an annular passage 78 formed in auxiliary pump end cap 42 about charge pump 84, the annular passage 78 lying adjacent charge pump o-ring 72. From there, the hydraulic fluid is recycled through charge relief inlet passage 79 and main pump inlet passage 32 to charge pump arcuate port 74*a*.

Figure 4:
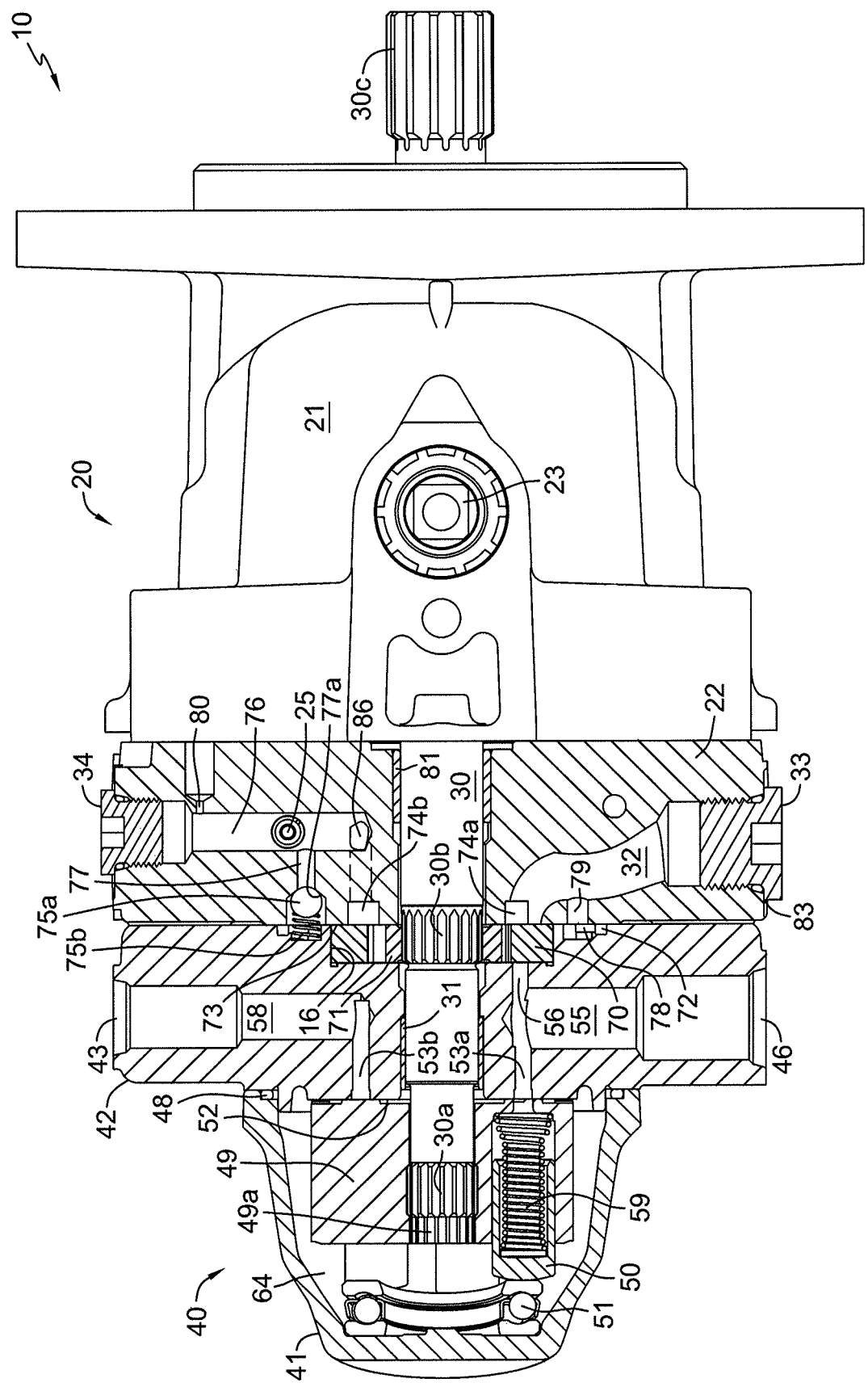
FIG. 4 is a partial section view of the hydraulic pump assembly of FIG. 3 along the line 4-4.

As best shown in FIG. 4, auxiliary pump inlet port 46 leads to auxiliary pump inlet passage 55 which intersects both the auxiliary pump arcuate port 53*a* and a second, charge pump arcuate port 56 formed in the pocket 16 containing charge pump 84. Thus, the auxiliary pump inlet passage 55 feeds both the auxiliary pump 40 and the charge pump 84. Additionally, charge pump 84 can be fed from both the main pump end cap 22 and the auxiliary pump end cap 42. Auxiliary pump 40 discharges fluid to external hydraulic devices through auxiliary pump outlet port 43 via auxiliary pump arcuate port 53*b* and auxiliary pump outlet passage 58. To balance the flow of hydraulic fluid in the auxiliary pump hydraulic circuit, the inside diameters of auxiliary pump inlet passage 55 and corresponding inlet port 46 are larger relative to those of the auxiliary pump outlet passage 58 and its corresponding outlet port 43. As depicted with main pump inlet port 83 plugged, hydraulic pump assembly 10 is configured to return hydraulic fluid from a reservoir or oil cooler via auxiliary pump inlet port 46, creating an open system configuration for the auxiliary pump hydraulic circuit (not shown). Were the main pump inlet port 83 to be opened and utilized to return hydraulic fluid from a reservoir or oil cooler, the auxiliary pump hydraulic circuit could be configured as a closed system.

Figure 8:
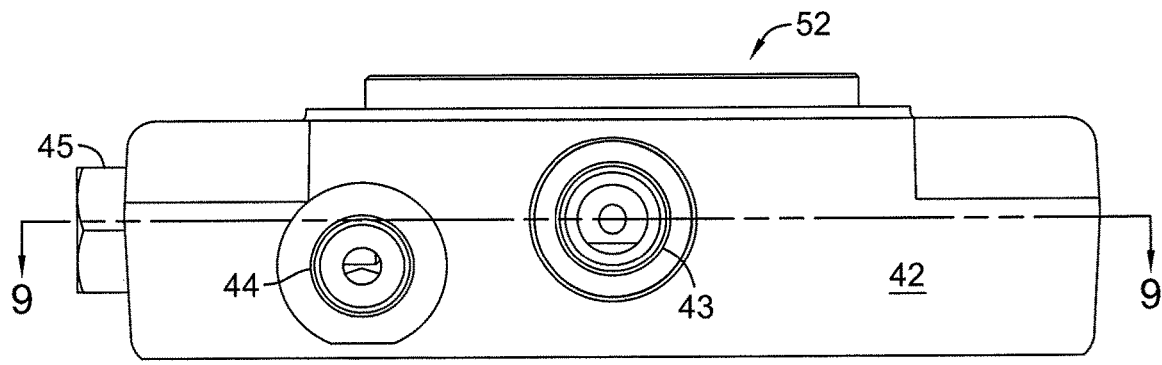
FIG. 8 is a side elevation view of the auxiliary pump end cap of the hydraulic pump assembly of FIG. 1.
Figure 9:
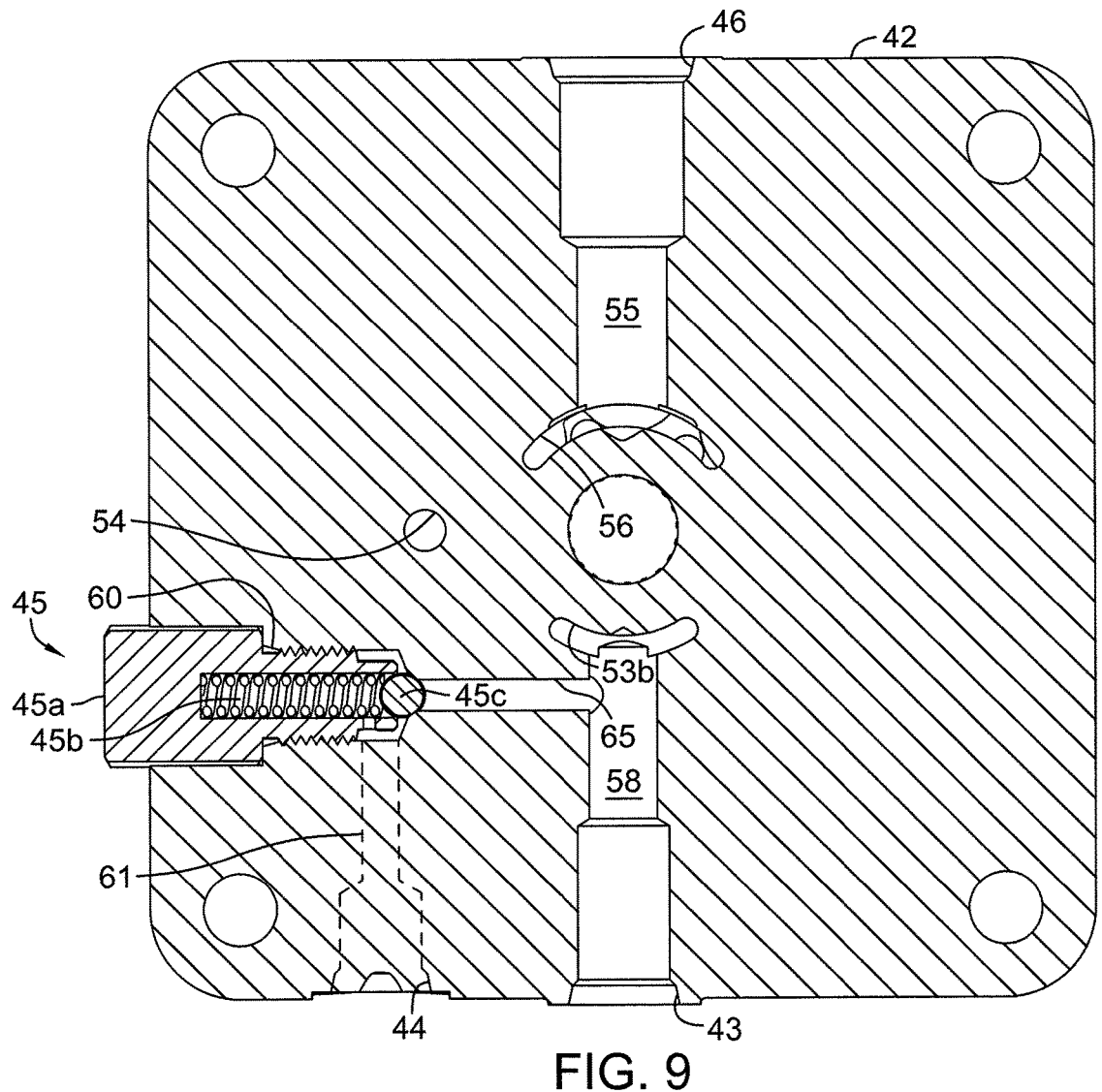
FIG. 9 is a section view of the end cap of FIG. 8 along the line 9-9.
Figure 10:
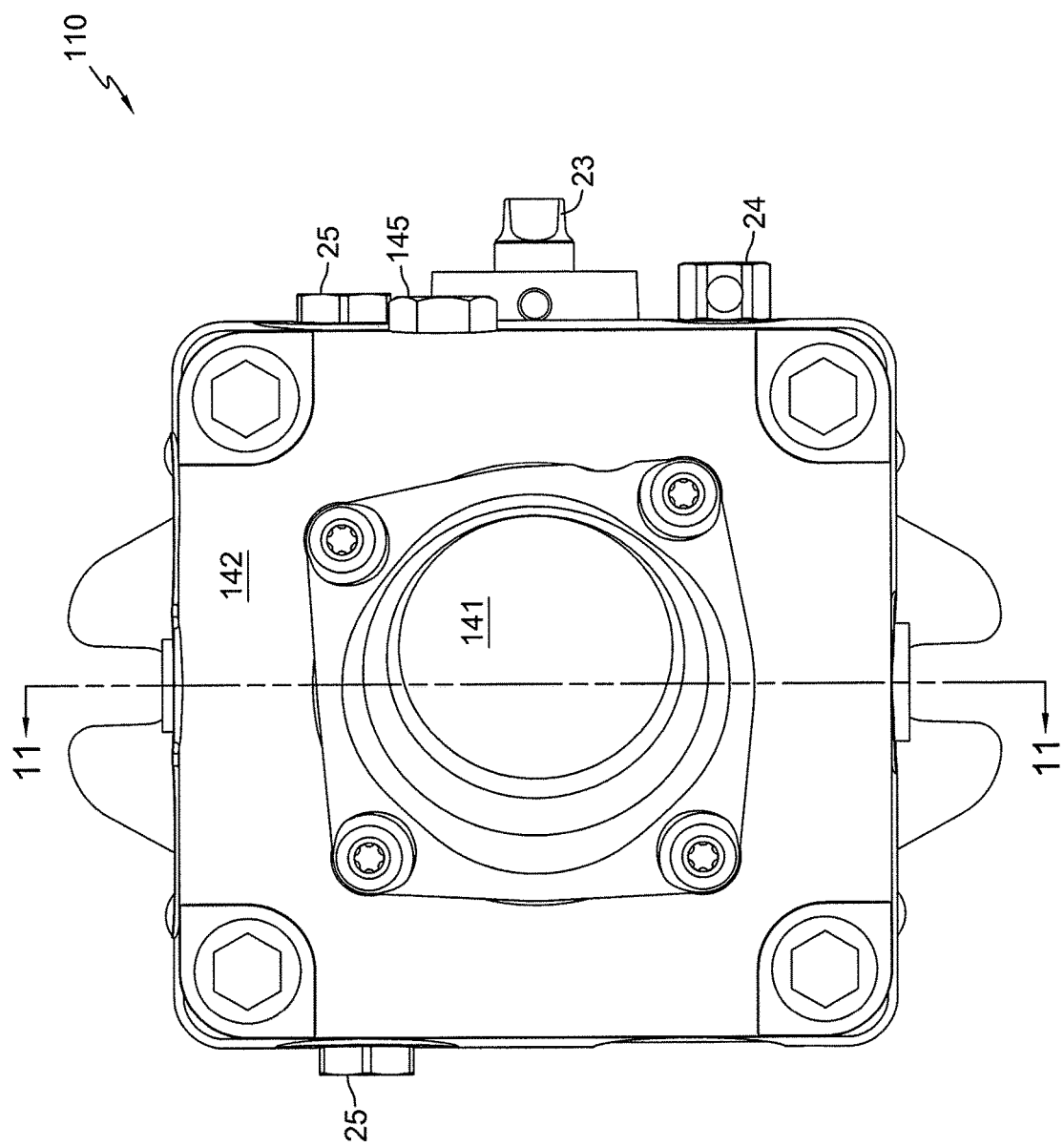
FIG. 10 is a top view of a second embodiment of a representative hydraulic pump assembly.
Figure 11:
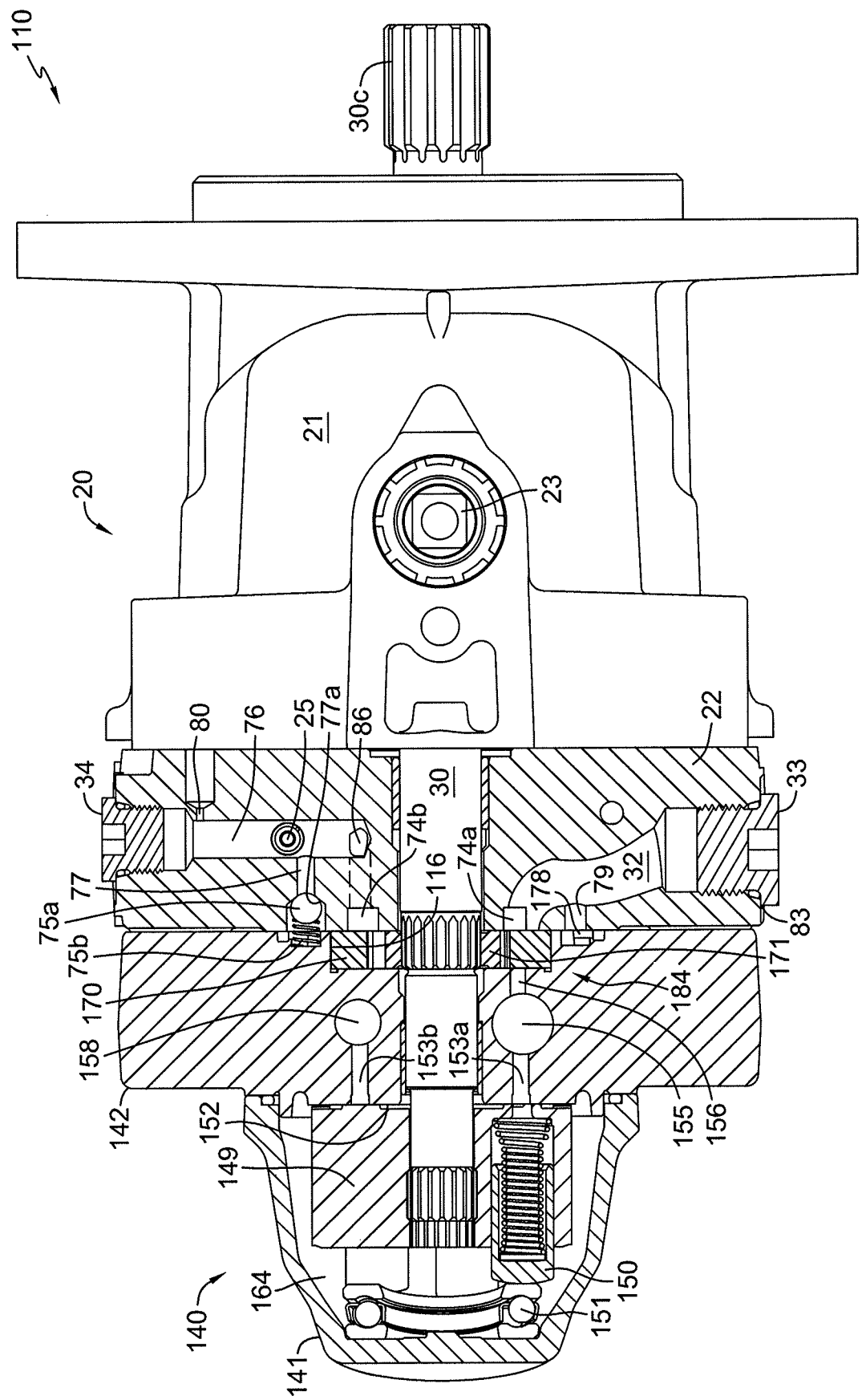
FIG. 11 is a partial section view of the hydraulic pump assembly of FIG. 10 along the line 11-11.
Figure 12:
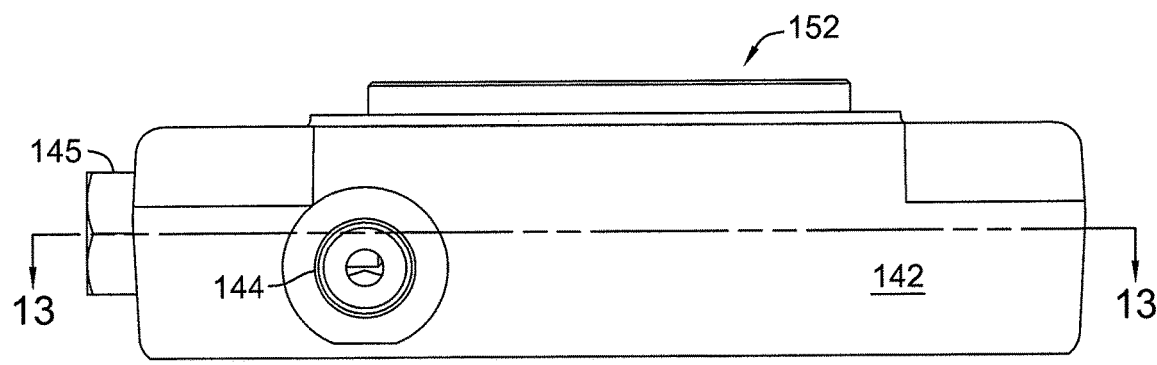
FIG. 12 is a side elevation view of the auxiliary pump end cap of the hydraulic pump assembly of FIG. 10.
Figure 13:
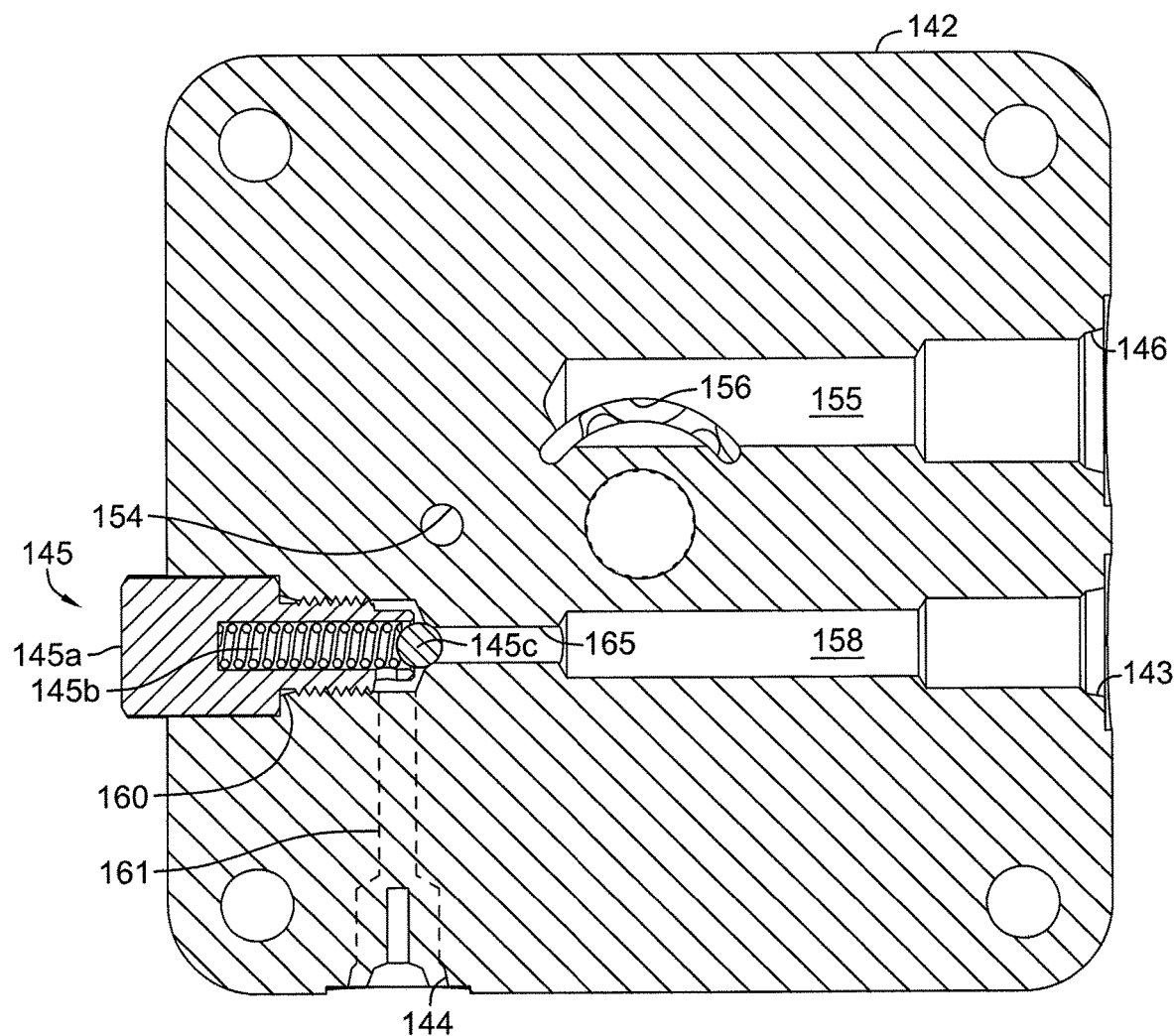
FIG. 13 is a section view of the end cap of FIG. 12 along the line 13-13.
Figure 14:
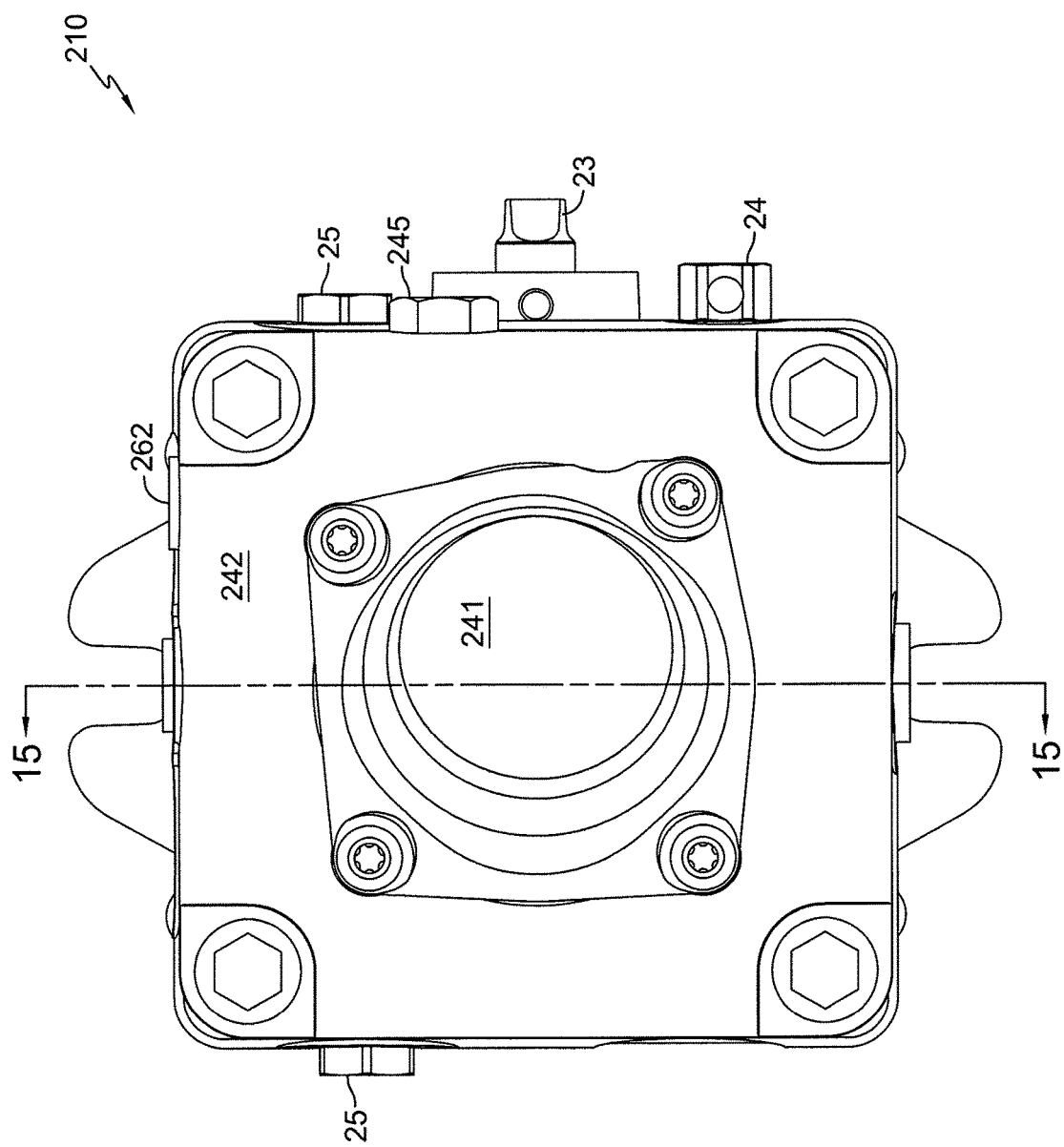
FIG. 14 is a top view of a third embodiment of a representative hydraulic pump assembly.

As shown in FIGS. 8 and 9, the auxiliary pump end cap 42 also possesses an auxiliary pump relief mechanism. An auxiliary pump relief valve 45 resides in auxiliary relief valve port 60, preventing unregulated fluid communication between auxiliary pump outlet bore 65, which sees the fluid pressure resident in auxiliary pump outlet passage 58, and auxiliary pump relief passage 61, which communicates externally via auxiliary pump relief port 44. Auxiliary pump relief valve 45 comprises a threaded plug 45*a* that receives a relief spring 45*b*, and a ball 45*c*. When the fluid pressure in auxiliary pump outlet bore 65 exceeds the cracking pressure of relief spring 45*b*, auxiliary pump relief valve 45 opens and places auxiliary pump outlet passage 58 in fluid communication with auxiliary pump relief port 44. Thus, the auxiliary pump relief system of hydraulic pump assembly 10 is designed to relieve hydraulic fluid to an external reservoir or oil cooler.

Figure 5:
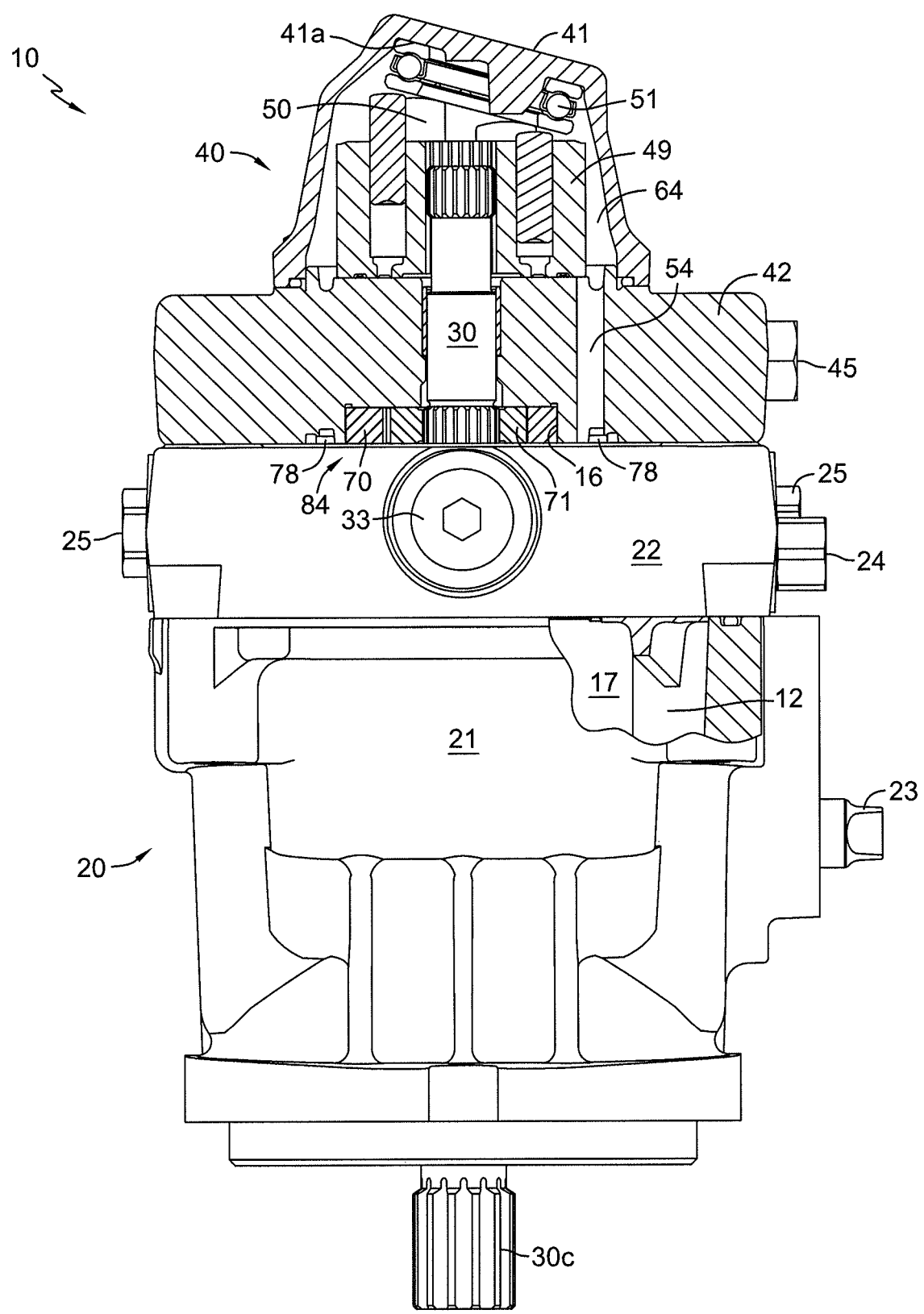
FIG. 5 is a partial section view of the hydraulic pump assembly of FIG. 3 along the line 5-5.
Figure 6:
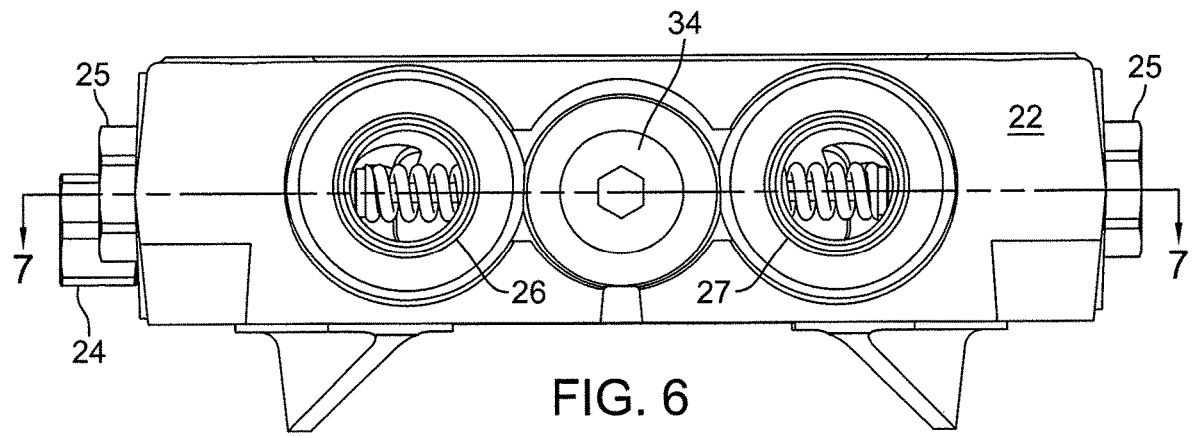
FIG. 6 is a side elevation view of the end cap of the main, axial piston pump of the hydraulic pump assembly of FIG. 1.
Figure 7:
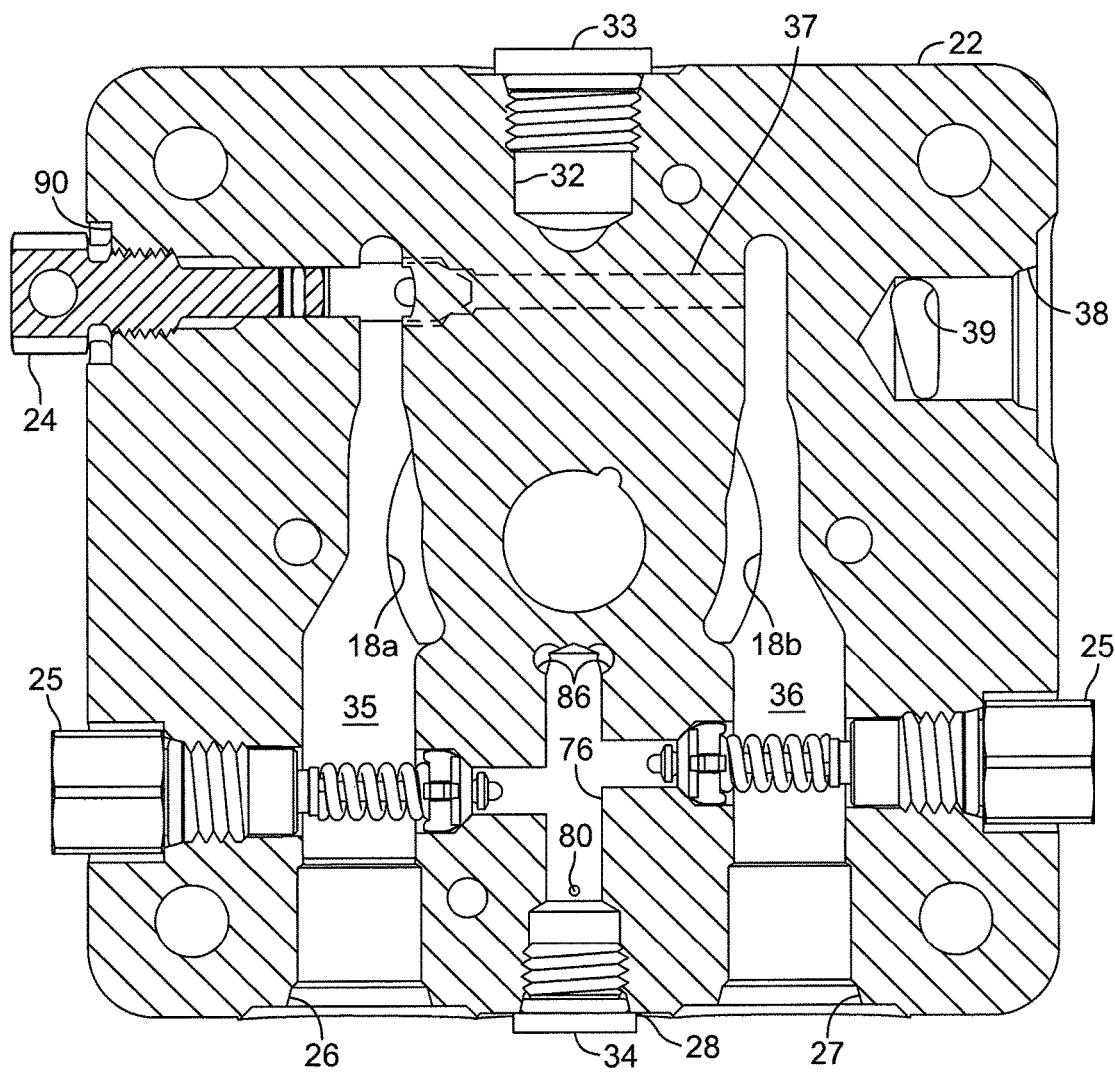
FIG. 7 is a section view of the end cap of FIG. 6 along the line 7-7 with some elements shown whole for clarity.

Normal hydraulic fluid losses by the auxiliary pump 40 that build up in auxiliary pump chamber 64 are removed through an auxiliary pump case drain 54 best illustrated in FIG. 5. The auxiliary pump case drain 54 communicates with annular passage 78, ultimately routing excess fluid to charge pump arcuate port 74a.

A second representative hydraulic pump assembly 110 having auxiliary pump 140 assembled to main pump 20 is depicted in FIGS. 10-13. The structure and function of main pump 20 and main pump end cap 22 is as previously described for hydraulic pump assembly 10 and will not be further described herein. The only differences between auxiliary pump 40 and auxiliary pump 140 are in the orientation of their respective inlet and outlet ports and passages. In auxiliary pump 40, auxiliary pump inlet passage 55, and auxiliary pump outlet passage 58 are oriented parallel to auxiliary pump relief passage 61 (with their respective ports, 46 and 43, on opposite sides of auxiliary pump end cap 42), and also parallel to the main pump system passages 35 and 36 of main pump end cap 22. In auxiliary pump 140, the auxiliary pump inlet passage 155 and auxiliary pump outlet passage 158 are oriented perpendicular to auxiliary pump relief passage 161 (with their respective ports, 146 and 143, located on the same side of auxiliary pump end cap 142), and also perpendicular to the main pump system passages 35 and 36 of the main pump end cap 22. The function of auxiliary pump end cap 142 is the same as that of auxiliary pump end cap 42. As with the first embodiment, the auxiliary pump inlet passage 155 feeds both the charge pump 184 and auxiliary pump 140, and the auxiliary pump relief passage 161 discharges fluid to an external reservoir or cooler (not shown) via auxiliary pump relief port 144.

A third representative hydraulic pump assembly 210 having auxiliary pump 240 assembled to main pump 20 is depicted in FIGS. 14-17. The structure and function of main pump 20 and main pump end cap 22 is as previously described for hydraulic pump assembly 10 and will not be further described herein. Auxiliary pump 240 varies from auxiliary pump 40 in the orientation of their respective inlet and outlet ports and passages, the location of their respective case drains, and most significantly, in the manner in which the auxiliary pump relief is treated. When hydraulic fluid of sufficient pressure in auxiliary pump outlet bore 265 cracks auxiliary pump relief valve 245, the fluid is recycled to the auxiliary pump inlet passage 255 via auxiliary pump recycle bore 263, as opposed to passing through auxiliary pump relief passage 261 and out the corresponding relief port 244, which is now closed with a threaded relief port plug 262.

Figure 15:
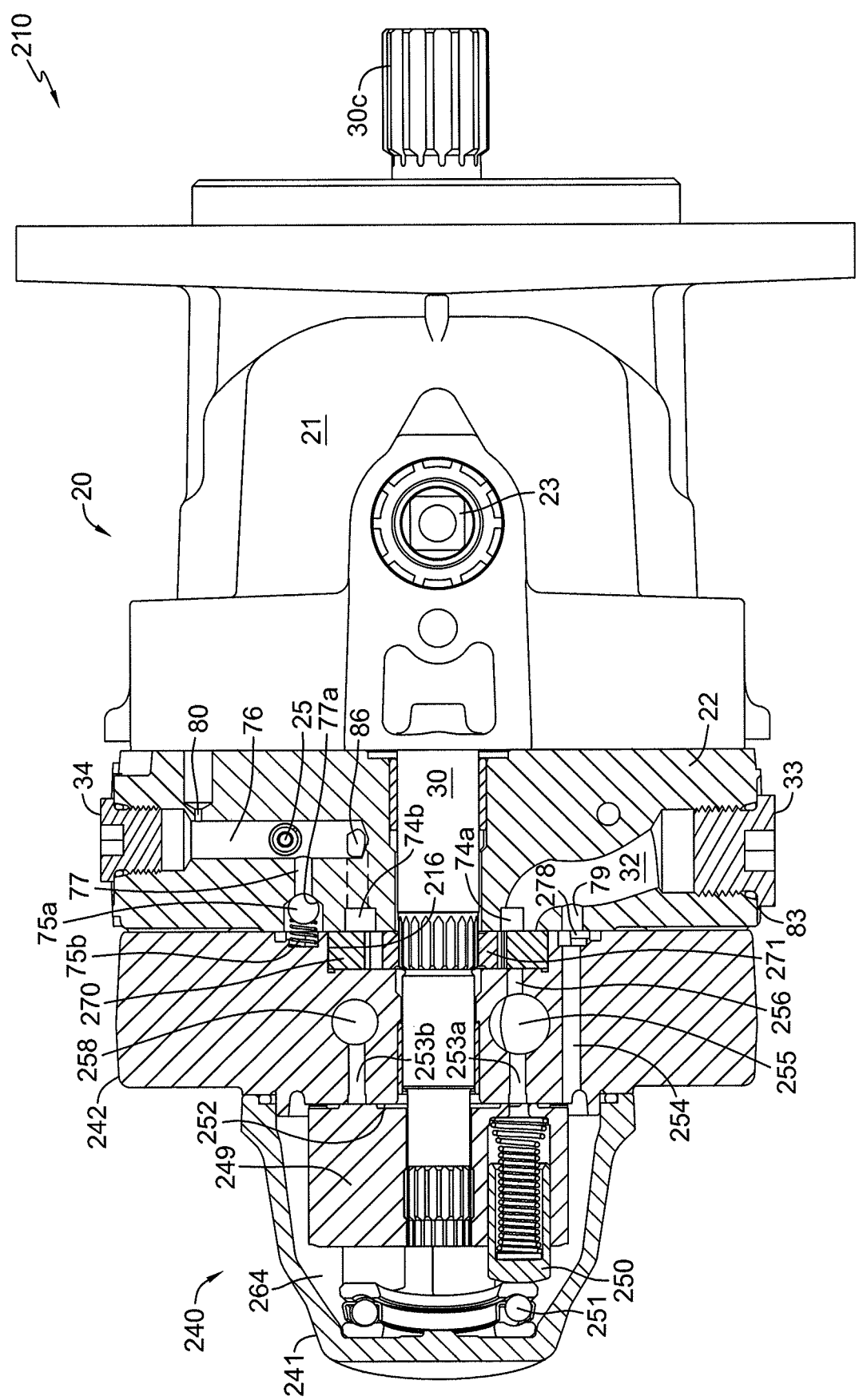
FIG. 15 is a partial section view of the hydraulic pump assembly of FIG. 14 along the line 15-15.
Figure 16:
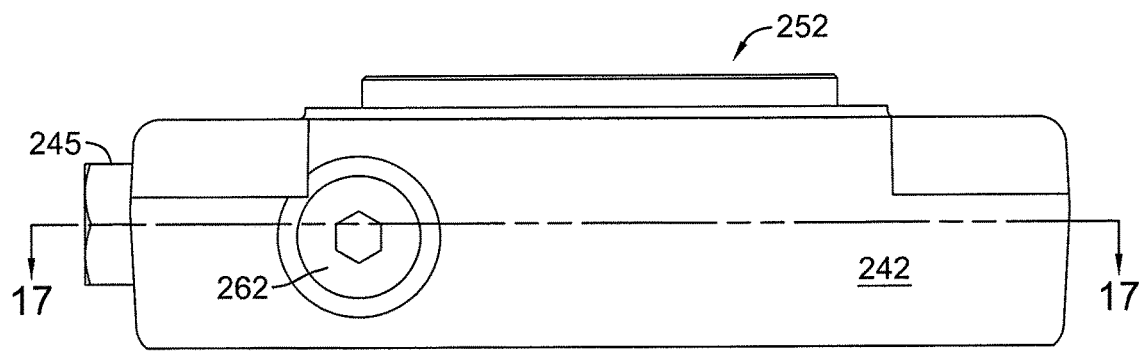
FIG. 16 is a side elevation view of the auxiliary pump end cap of the hydraulic pump assembly of FIG. 14.
Figure 17:
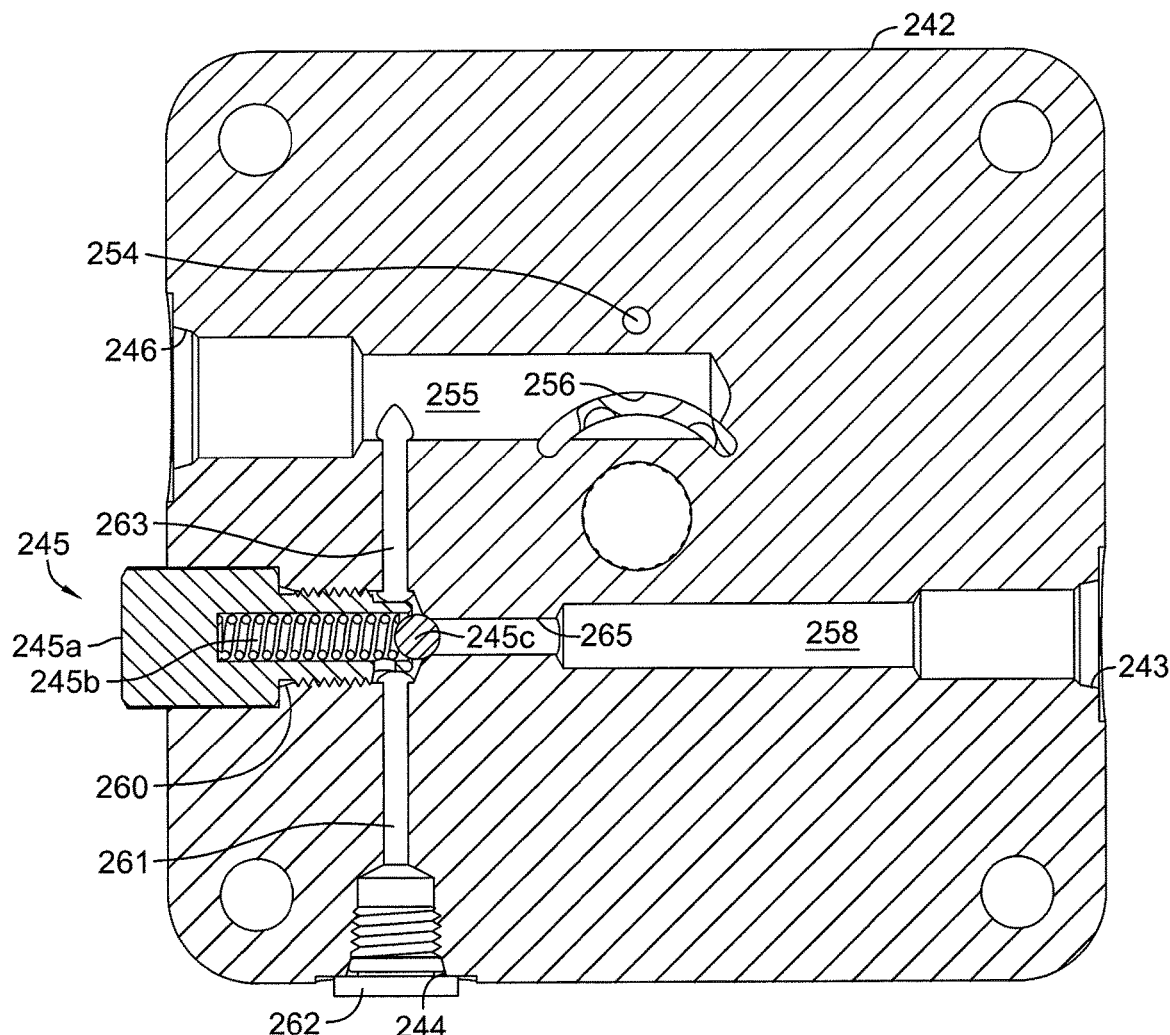
FIG. 17 is a section view of the end cap of FIG. 16 along the line 17-17.
Figure 18:
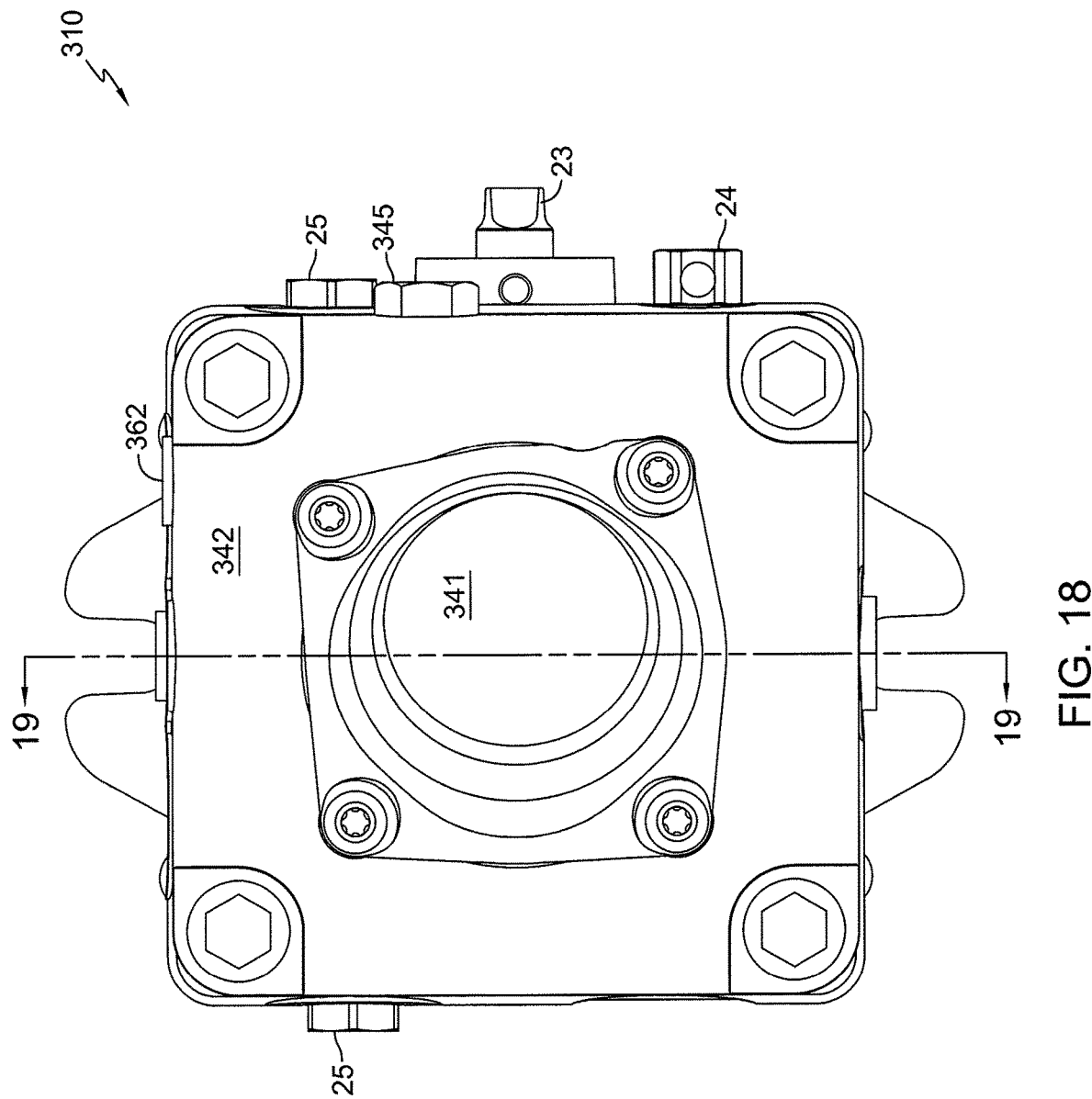
FIG. 18 is a top view of a fourth embodiment of a representative hydraulic pump assembly.
Figure 19:
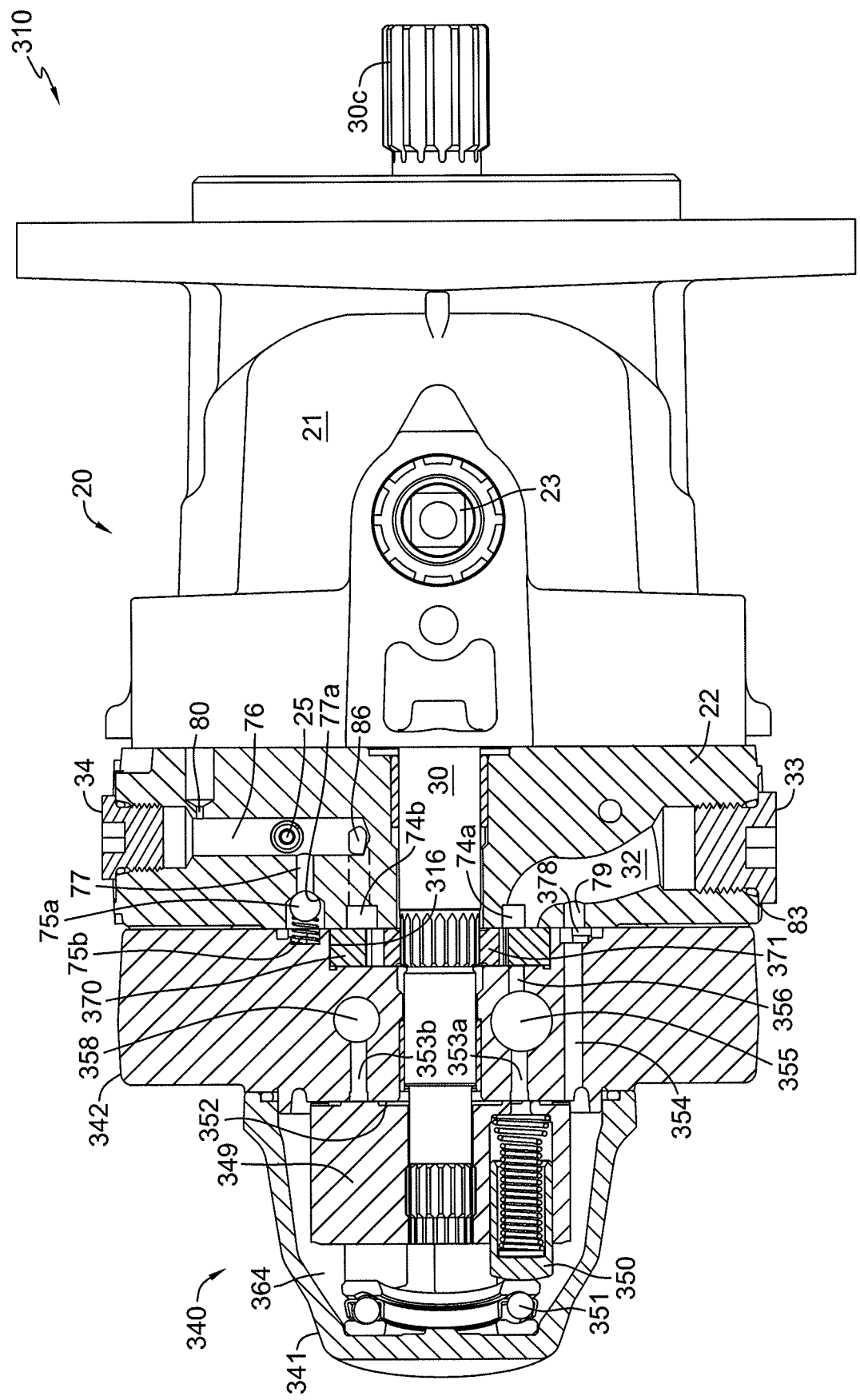
FIG. 19 is a partial section view of the hydraulic pump assembly of FIG. 18 along the line 19-19.
Figure 20:
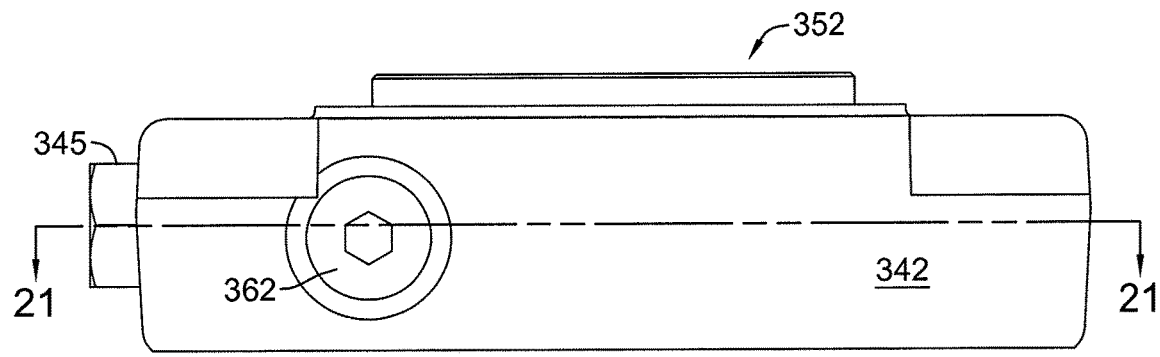
FIG. 20 is a side elevation view of the auxiliary pump end cap of the hydraulic pump assembly of FIG. 18.
Figure 21:
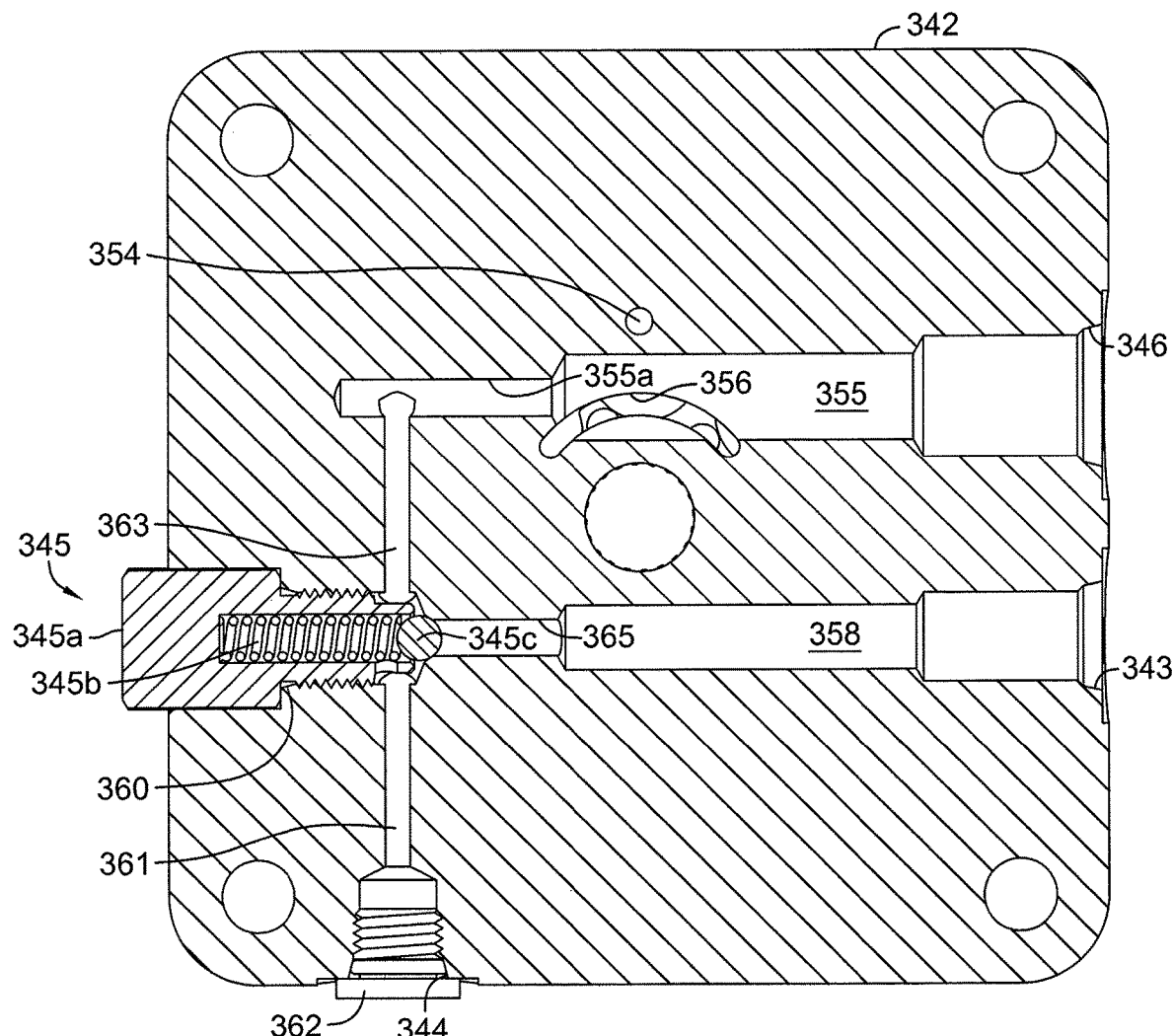
FIG. 21 is a section view of the end cap of FIG. 20 along the line 21-21.
Figure 22:
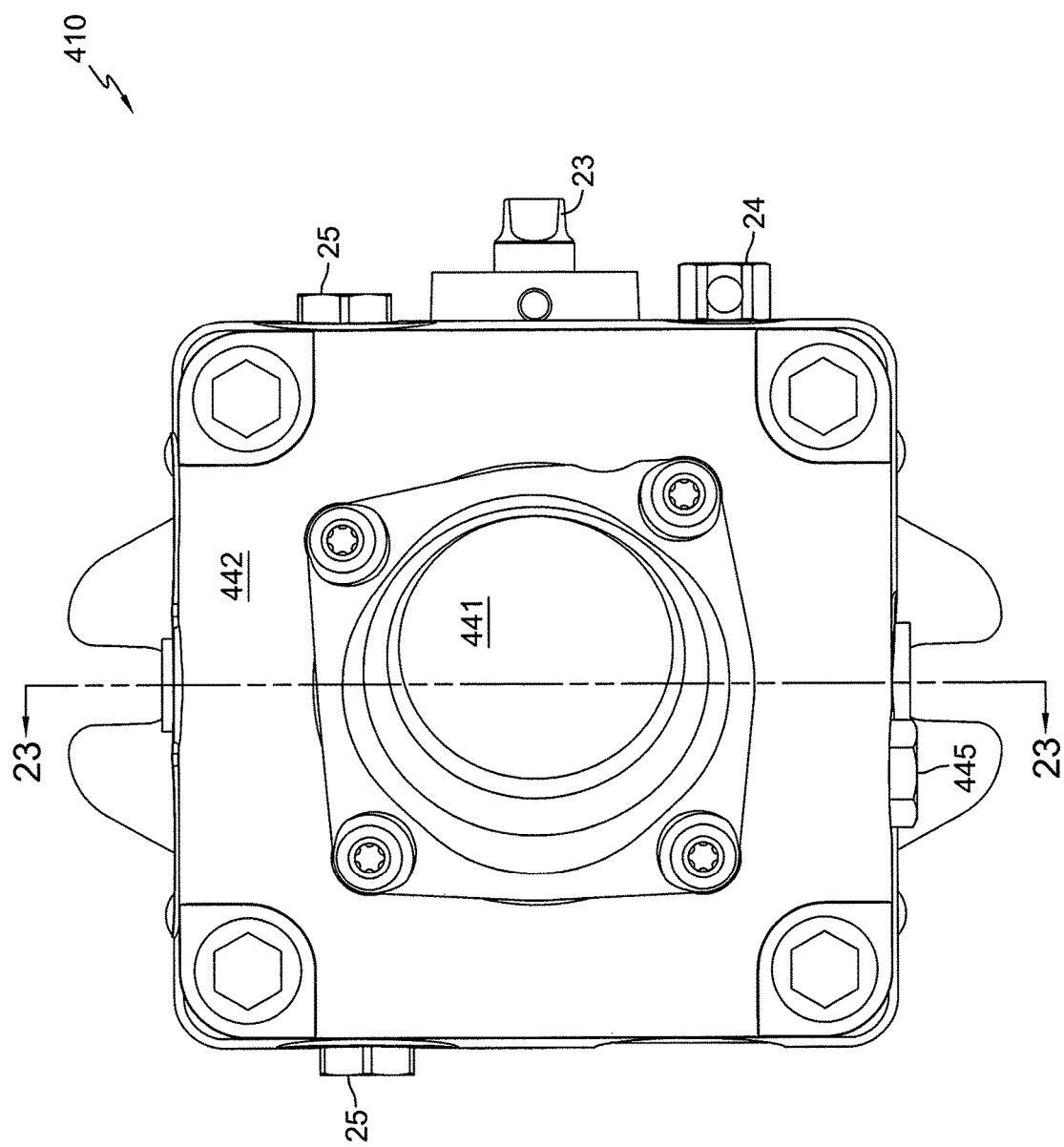
FIG. 22 is a top view of a fifth embodiment of a representative hydraulic pump assembly.
Figure 23:
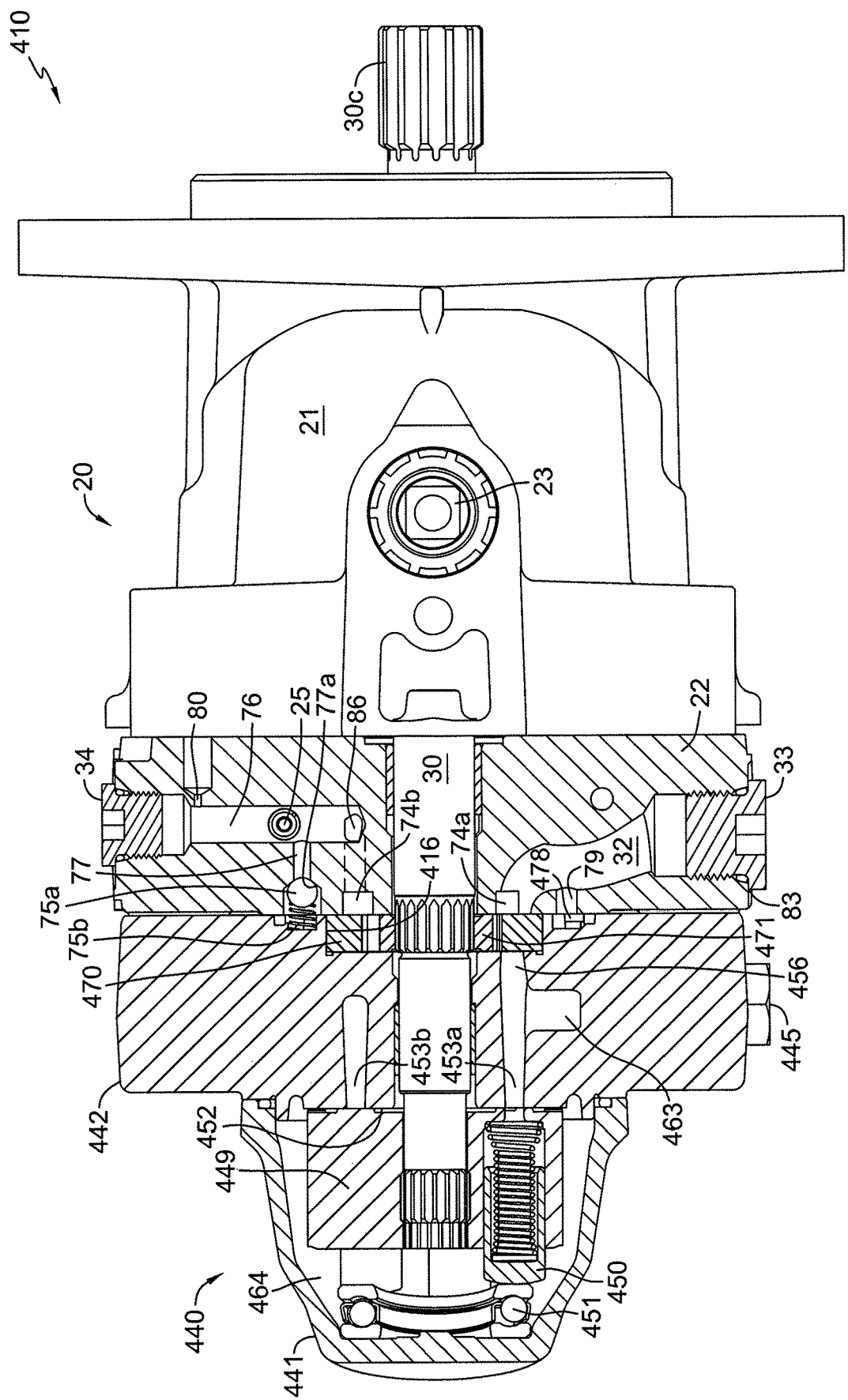
FIG. 23 is a partial section view of the hydraulic pump assembly of FIG. 22 along the line 23-23.
Figure 24:
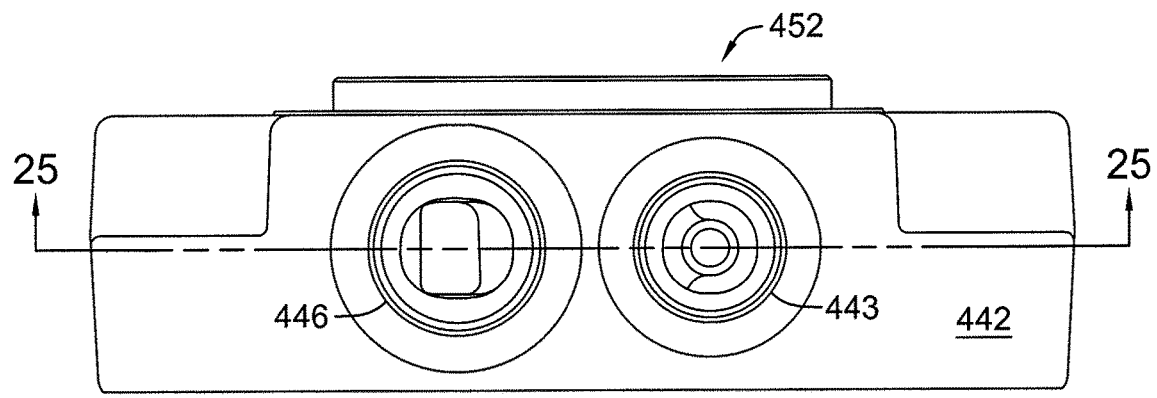
FIG. 24 is a side elevation view of the auxiliary pump end cap of the hydraulic pump assembly of FIG. 22.
Figure 25:
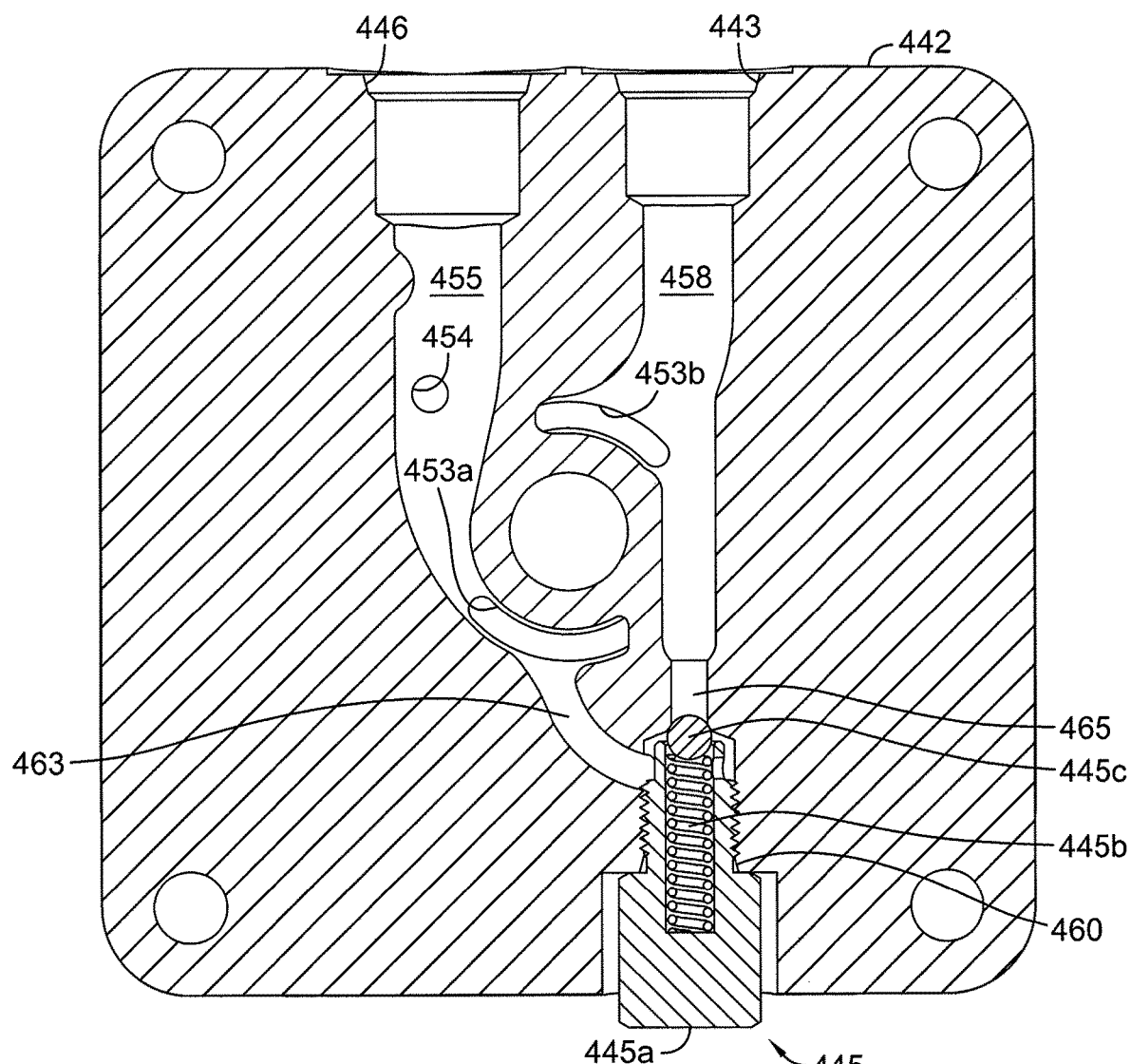
FIG. 25 is a section view of the end cap of FIG. 24 along the line 25-25.
Figure 27:
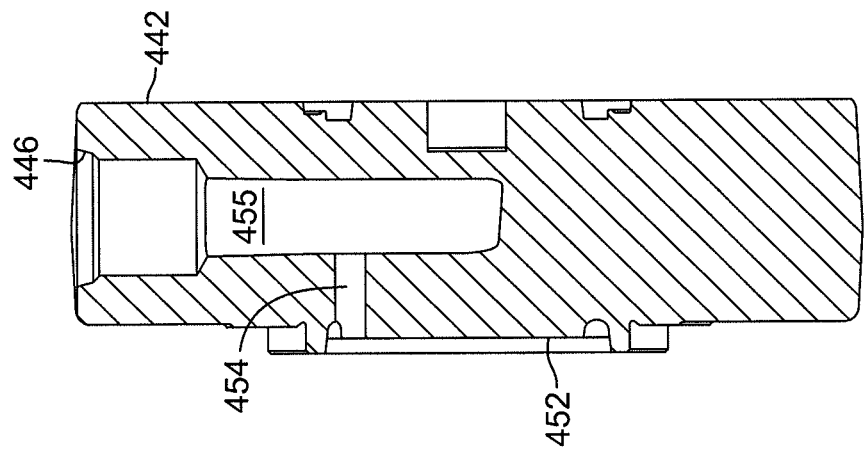
FIG. 27 is a section view of the end cap of FIG. 26 along the line 27-27.
Figure 26:
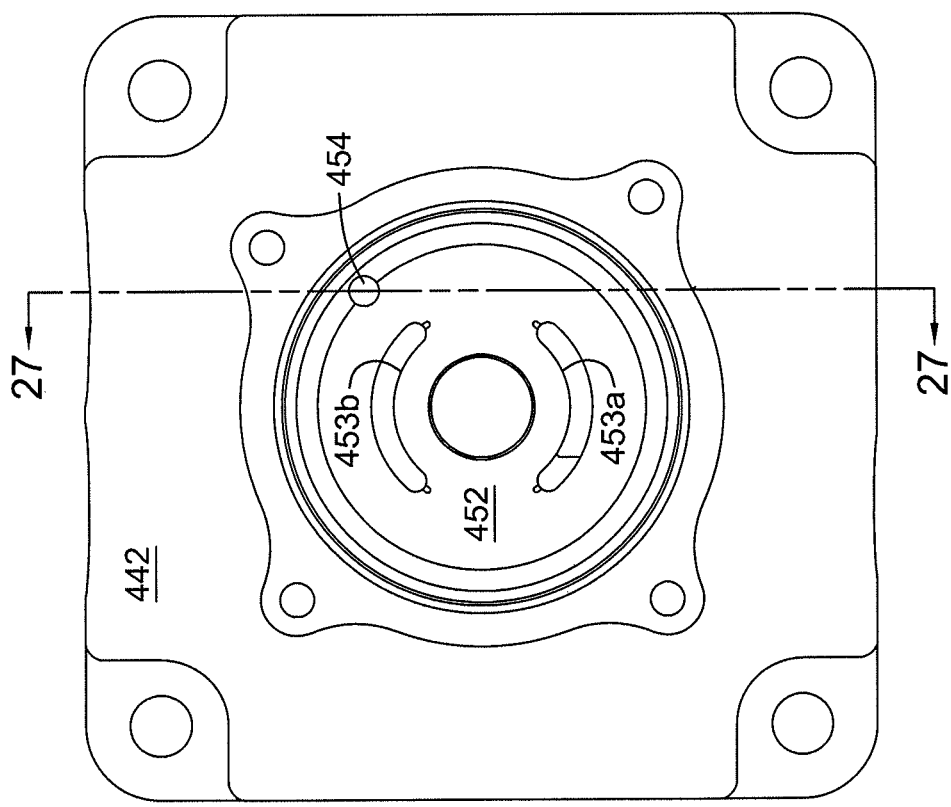
FIG. 26 is a top view of the end cap of FIG. 24.
Figure 28:
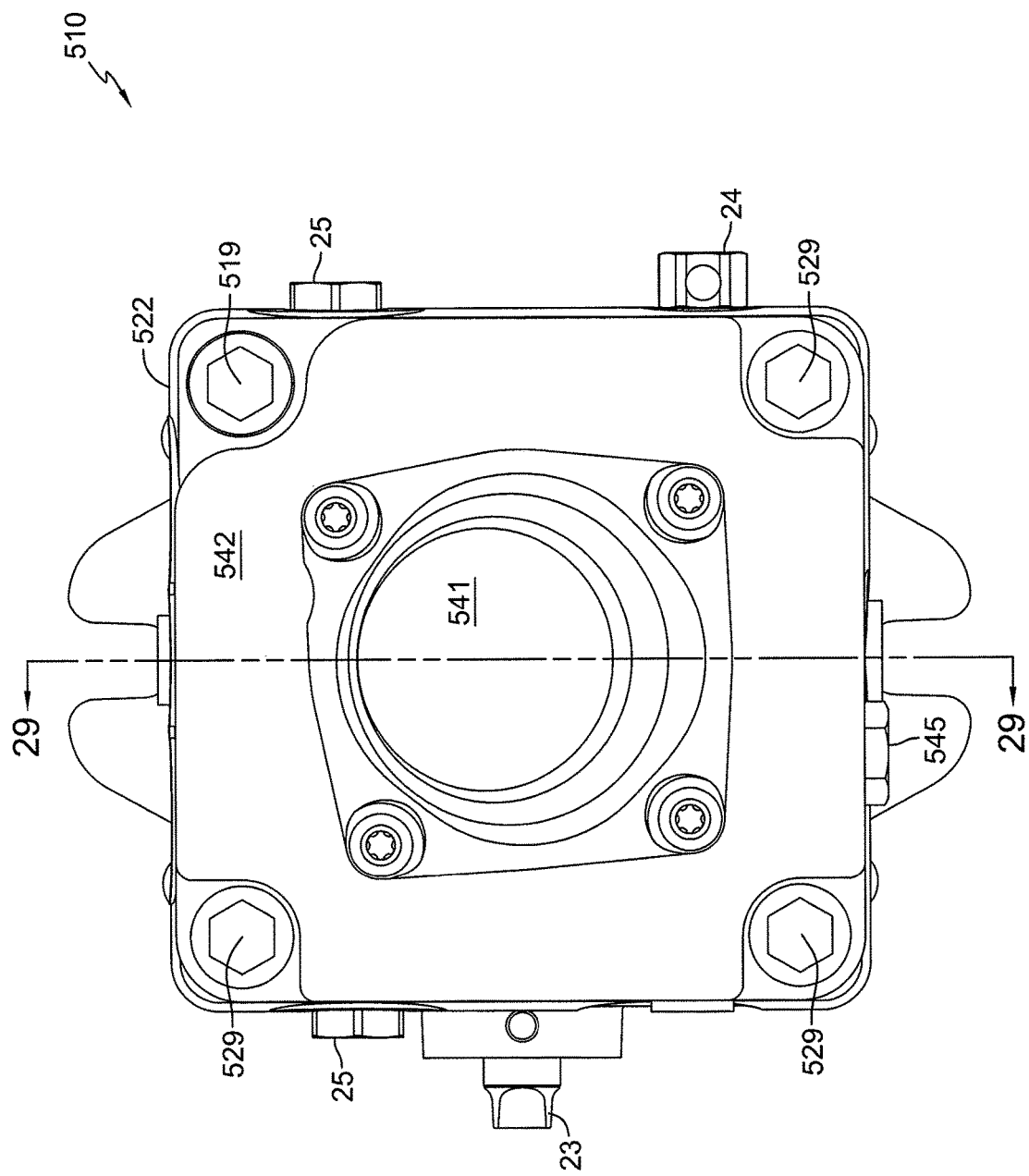
FIG. 28 is a top view of a sixth embodiment of a representative hydraulic pump assembly.
Figure 29:
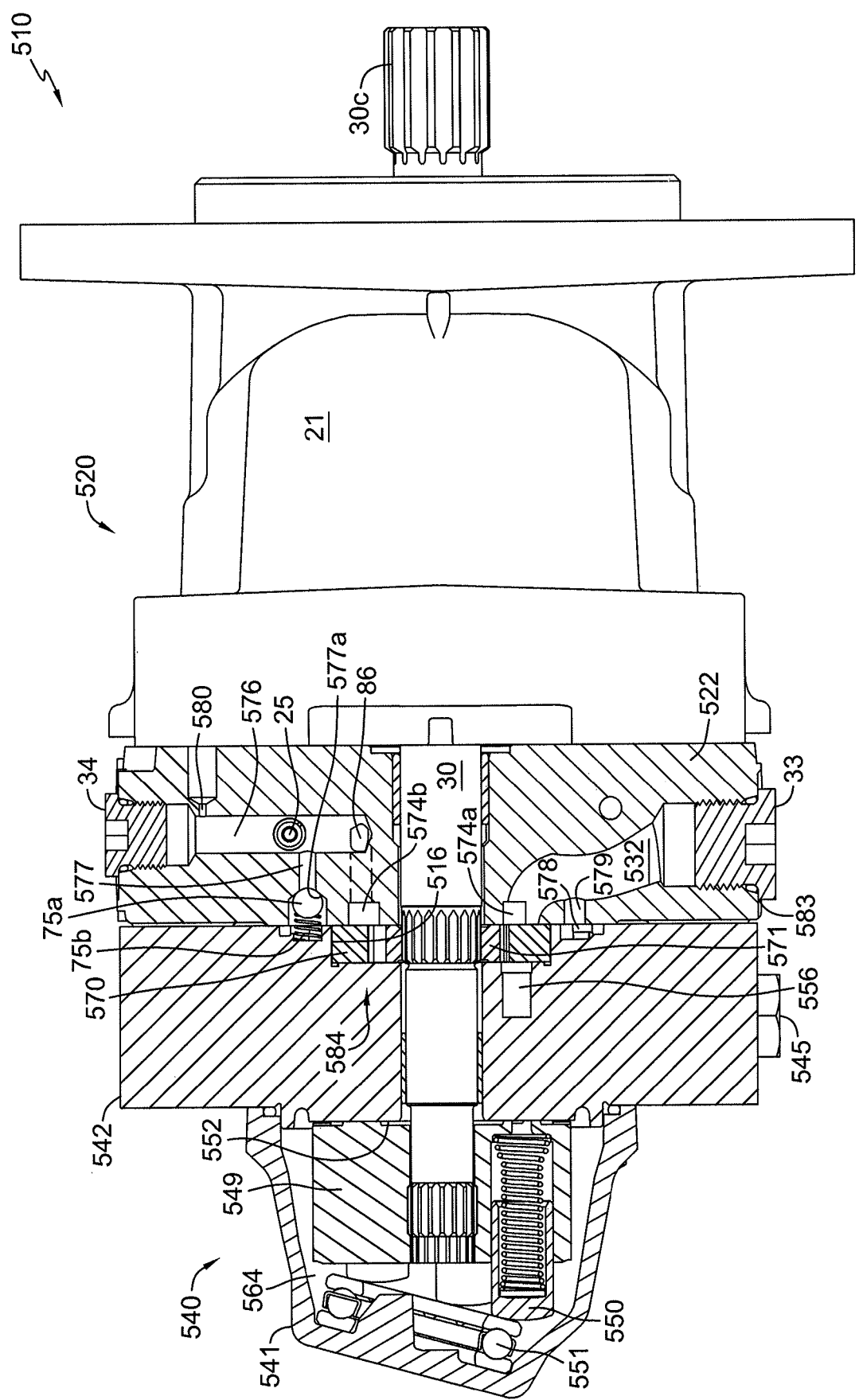
FIG. 29 is a partial section view of the hydraulic pump assembly of FIG. 28 along the line 29-29.
Figure 30:
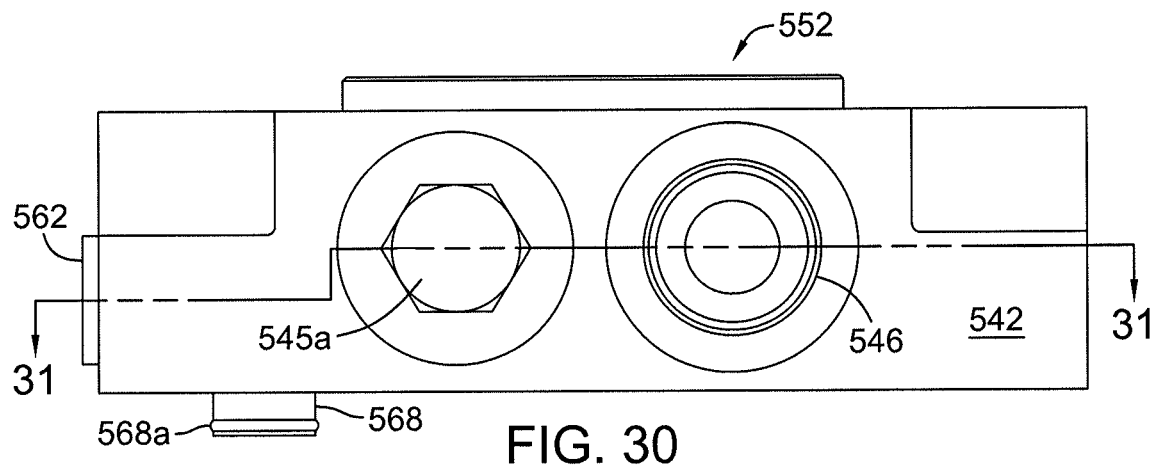
FIG. 30 is a side elevation view of the auxiliary pump end cap of the hydraulic pump assembly of FIG. 28.
Figure 31:
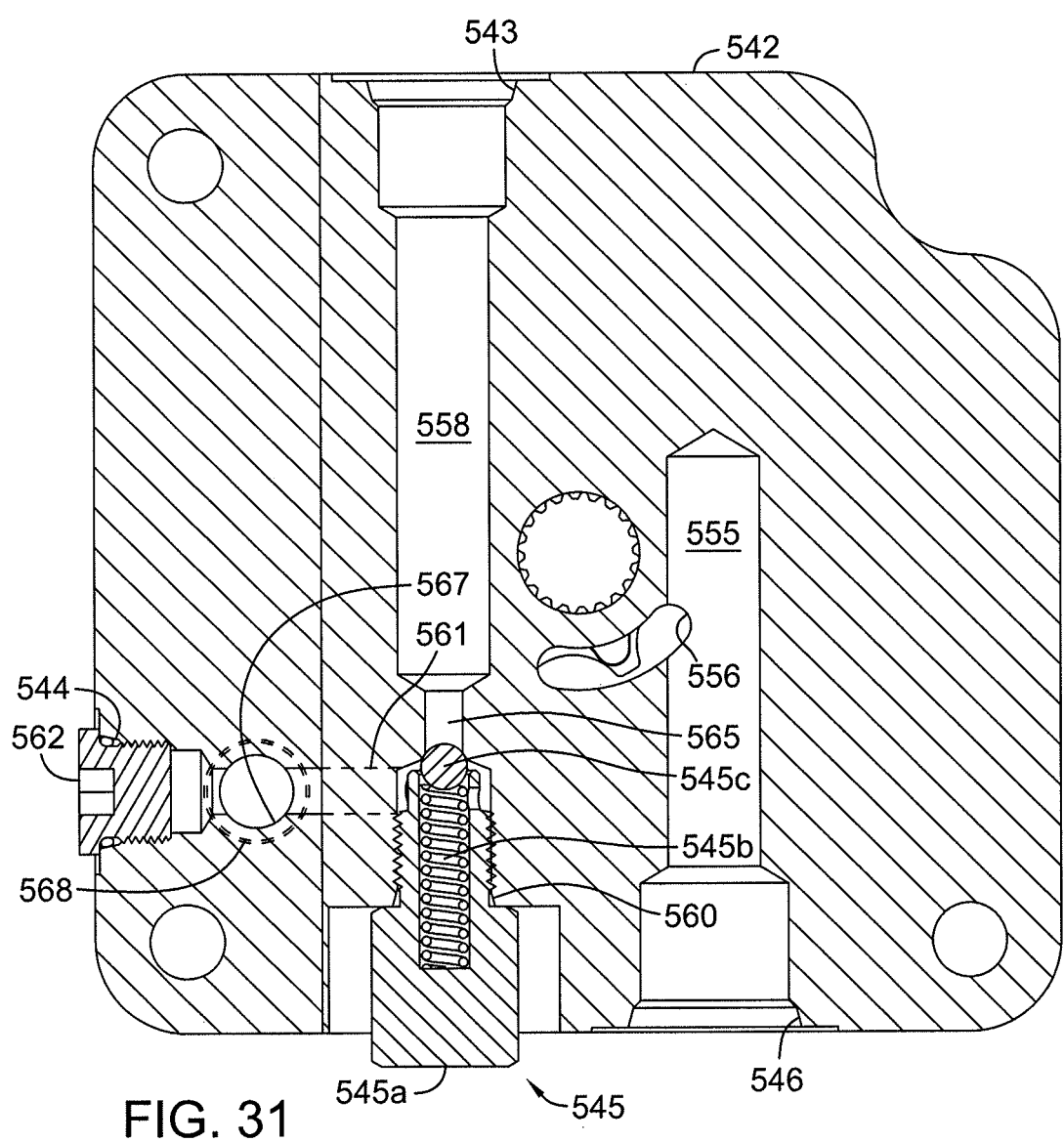
FIG. 31 is a section view of the end cap of FIG. 30 along the line 31-31.
Figure 32:
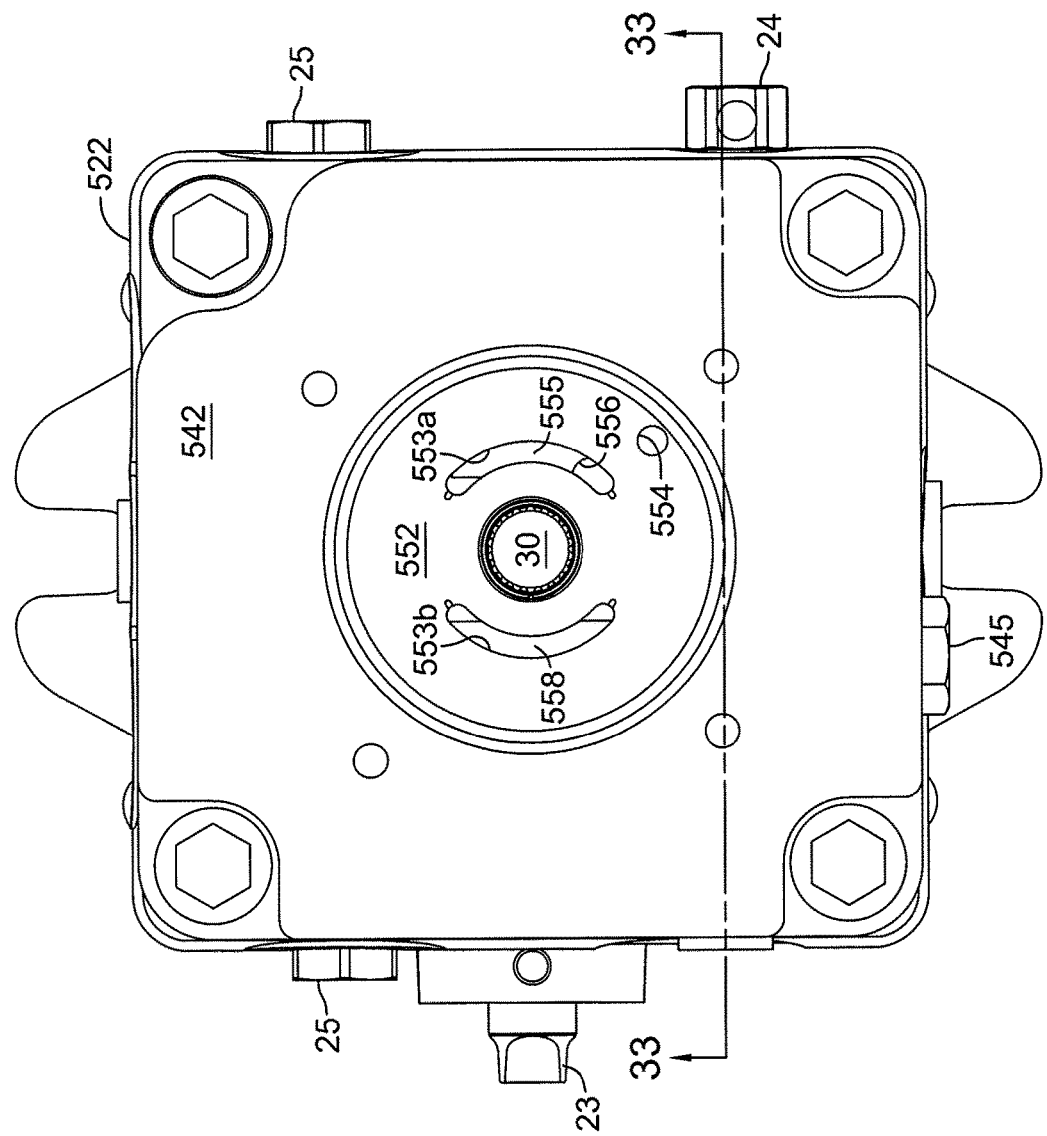
FIG. 32 is a top view of the hydraulic pump assembly of FIG. 28 with the auxiliary pump housing and the auxiliary pump removed.

As compared to the porting of auxiliary pump 40 previously described, the auxiliary pump inlet passage 255 of auxiliary pump 240 and auxiliary pump outlet passage 258 are oriented perpendicular to its auxiliary pump relief passage 261 (with their respective ports, 246 and 243, located on opposite sides of auxiliary pump end cap 242), and also perpendicular to the main pump system passages 35 and 36 of the main pump end cap 22. As best illustrated in FIGS. 15 and 17, the case drain 254 of auxiliary pump end cap 242 is relocated (moved 90 degrees relative to the axis of pump shaft 30 to a position adjacent auxiliary pump inlet passage 255), but continues to drain excess fluid from the auxiliary pump chamber 264 to annular passage 278, and ultimately, charge pump arcuate port 74a.

A fourth representative hydraulic pump assembly 310 having auxiliary pump 340 assembled to main pump 20 is depicted in FIGS. 18-21. The structure and function of main pump 20 and main pump end cap 22 is as previously described for hydraulic pump assembly 10 and will not be further described herein. Auxiliary pump 340 varies from the previously described auxiliary pump 240 in only one regard. The auxiliary pump inlet passage 355, while remaining parallel to auxiliary pump outlet passage 358, has been reoriented to have its corresponding inlet port 346 on the same side of auxiliary pump end cap 342 as that of auxiliary pump outlet port 343. As a consequence, auxiliary pump inlet passage 355 has been extended though a bore 355a in order to provide fluid communication with auxiliary pump recycle bore 363. The function of auxiliary pump end cap 342 is the same as that of auxiliary pump end cap 242.

A fifth representative hydraulic pump assembly 410 having auxiliary pump 440 assembled to main pump 20 is depicted in FIGS. 22-27. The structure and function of main pump 20 and main pump end cap 22 is as previously described for hydraulic pump assembly 10 and will not be further described herein. The function of auxiliary pump 440 and its end cap 442 is substantially the same as that of the previously described auxiliary pumps 240 and 340 and their respective end caps 242 and 342. The auxiliary pump relief valve 445 recycles hydraulic fluid into the auxiliary pump arcuate port 453a via a recycle passage 463, which also communicates with charge pump arcuate port 456 in pocket 416. However, the auxiliary pump end cap 442 has been simplified, taking advantage of modern casting techniques to form the porting, as opposed to machining techniques (as evident in the straight bores and right angle intersections of porting in auxiliary pump end caps 42, 142, 242 and 342). Consequently, the equivalent of auxiliary pump relief passages 261 and 361, their corresponding relief ports, 244 and 344, and threaded plugs, 262 and 362, which were necessary to machine auxiliary pump recycle bores 263 and 363, are no longer needed to form a fluid passage connecting the auxiliary pump relief to the auxiliary pump arcuate port 453a. Recycle passage 463 may be formed directly by a casting operation.

Other differences between auxiliary pump end cap 442 and auxiliary pump end caps 242 and 342 include the routing of the case drain 454 and the orientation of the porting in general. As best viewed in FIGS. 25-27, excess fluid build-up in the auxiliary pump chamber 464 is directed to the auxiliary pump inlet passage 455 via case drain 454. This excess fluid is no longer routed to the annular passage 478, and ultimately, to the charge pump arcuate port 74a. The porting of auxiliary pump end cap 442 is generally oriented parallel to the main pump system passages 35 and 36, the auxiliary pump inlet port 446 and auxiliary pump outlet port 443 being located on the same side of the auxiliary pump end cap 442, and adjacent system ports 26 and 27.

A sixth representative hydraulic pump assembly 510 having auxiliary pump 540 assembled to a main pump 520 is depicted in FIGS. 28-33. Auxiliary pump 540 is distinguishable from previously depicted embodiments in that the discharge of auxiliary pump relief valve 545 is routed through the main pump drain port 538. In addition to the modifications enumerated below, auxiliary pump end cap 542 varies from the previous five embodiments by utilizing only three fasteners 529 to mate it to main pump end cap 522 and main pump housing 21. This represents a material and machining savings, and permits a reduced-length fastener 519 (as compared to fastener 529) to complete the joining of main pump end cap 522 and main pump housing 21. The structure and function of main pump 520 and main pump end cap 522 is as previously described for main pump 20 and main pump end cap 22, except an additional drain passage 566 has been added to main pump end cap 522 to receive the discharge of auxiliary pump relief valve 545.

Figure 33:
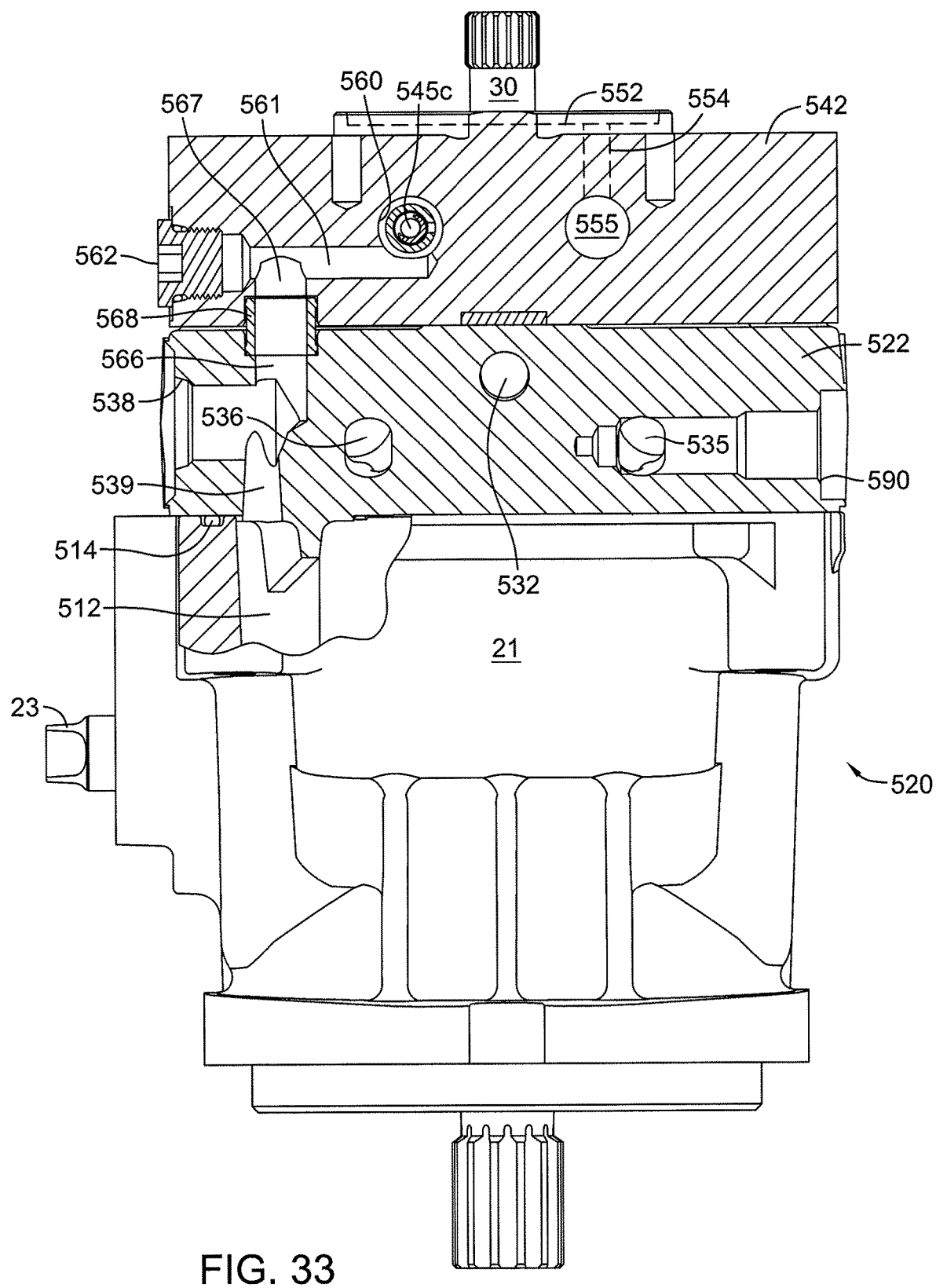
FIG. 33 is a partial section view of the hydraulic pump assembly of FIG. 32 along the line 33-33 with a portion of the main pump housing removed.
Figure 34:
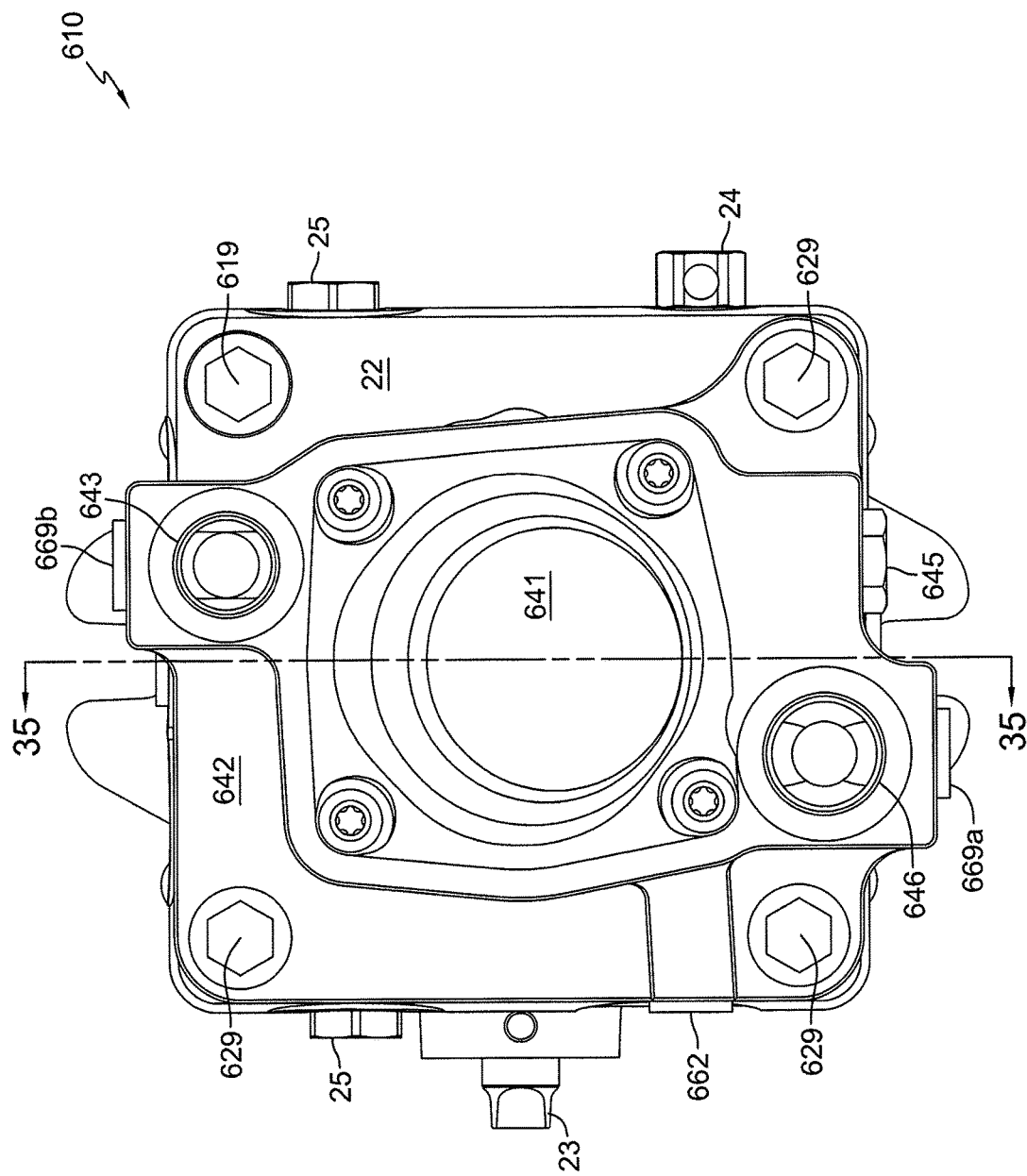
FIG. 34 is a top view of a seventh embodiment of a representative hydraulic pump assembly.
Figure 35:
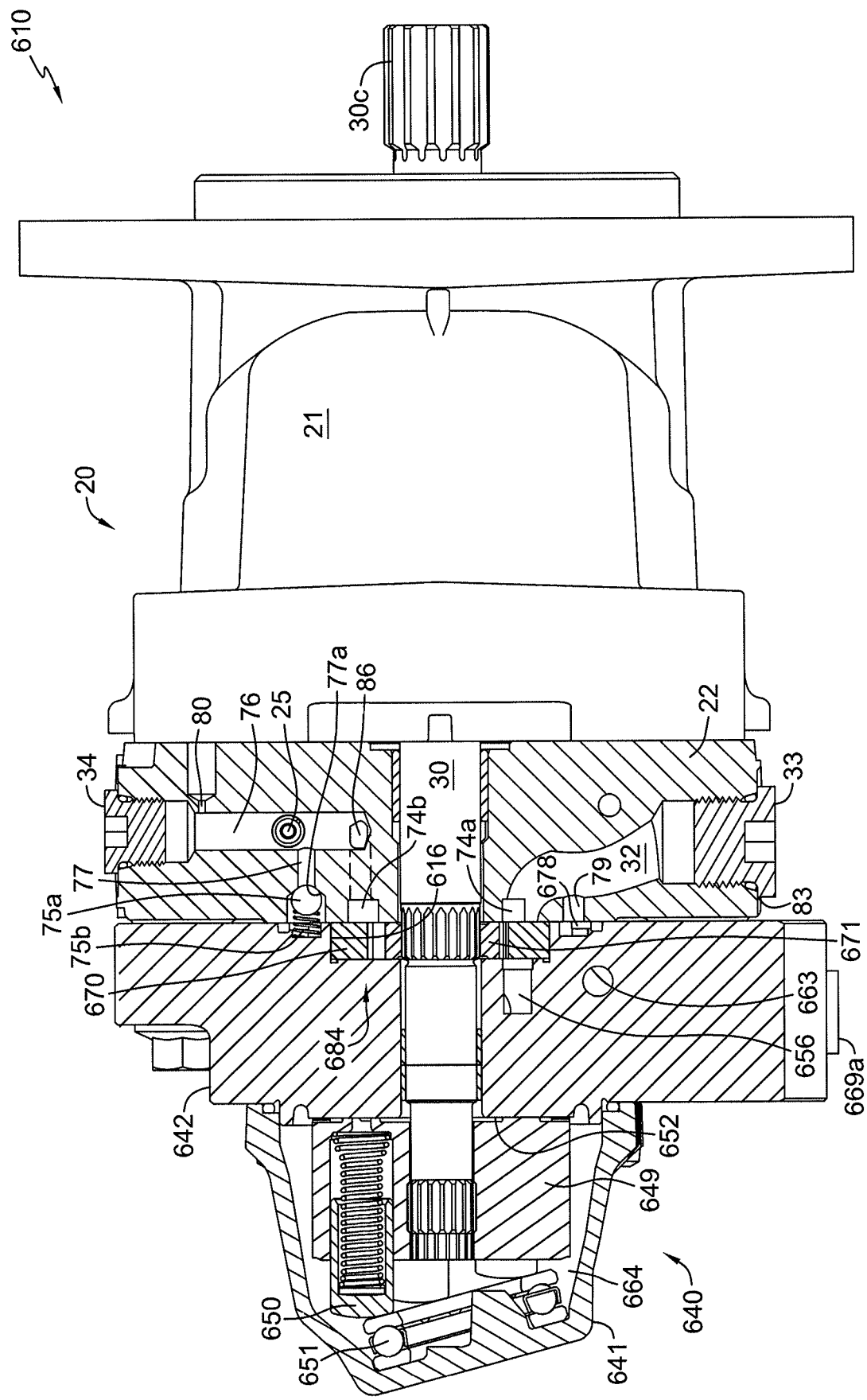
FIG. 35 is a partial section view of the hydraulic pump assembly of FIG. 34 along the line 35-35.
Figure 36:
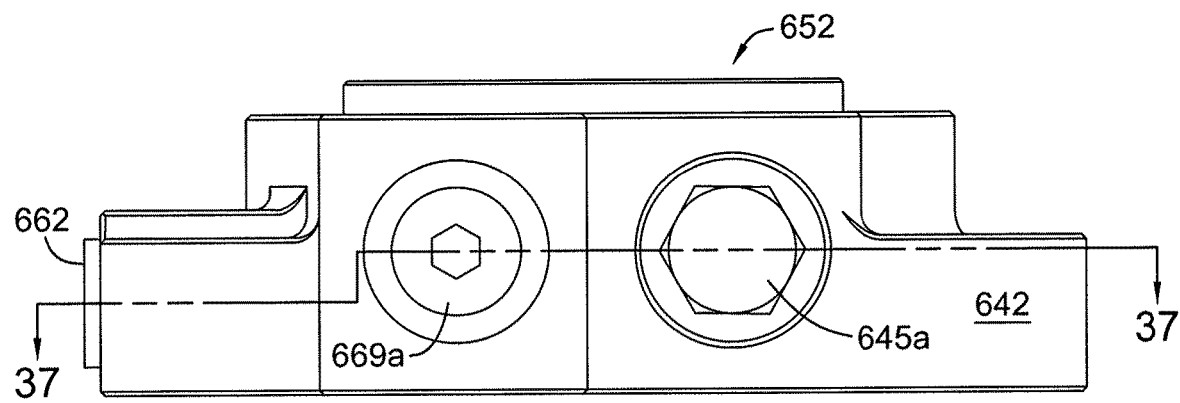
FIG. 36 is a side elevation view of the auxiliary pump end cap of the hydraulic pump assembly of FIG. 34.
Figure 37:
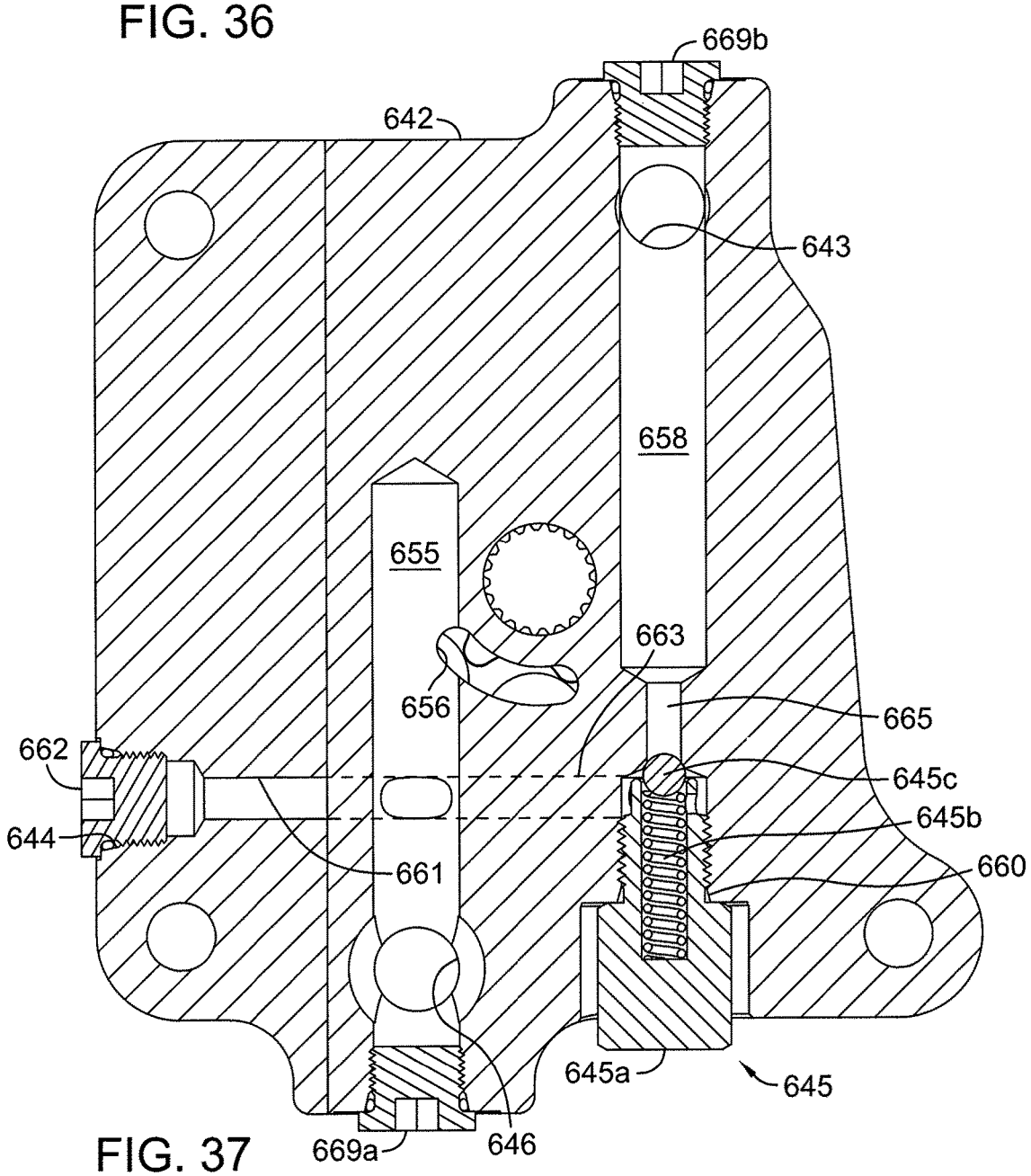
FIG. 37 is a section view of the end cap of FIG. 36 along the line 37-37.
Figure 40:
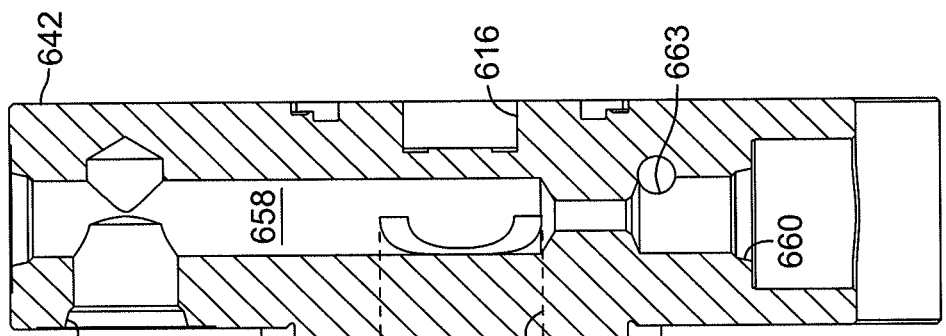
FIG. 40 is a section view of the end cap of FIG. 38 along the line 40-40.
Figure 39:
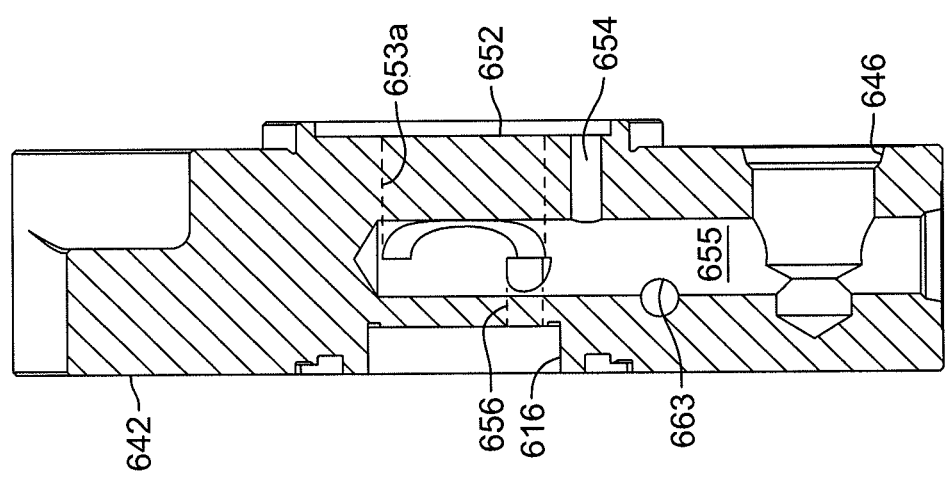
FIG. 39 is a section view of the end cap of FIG. 38 along the line 39-39.
Figure 38:
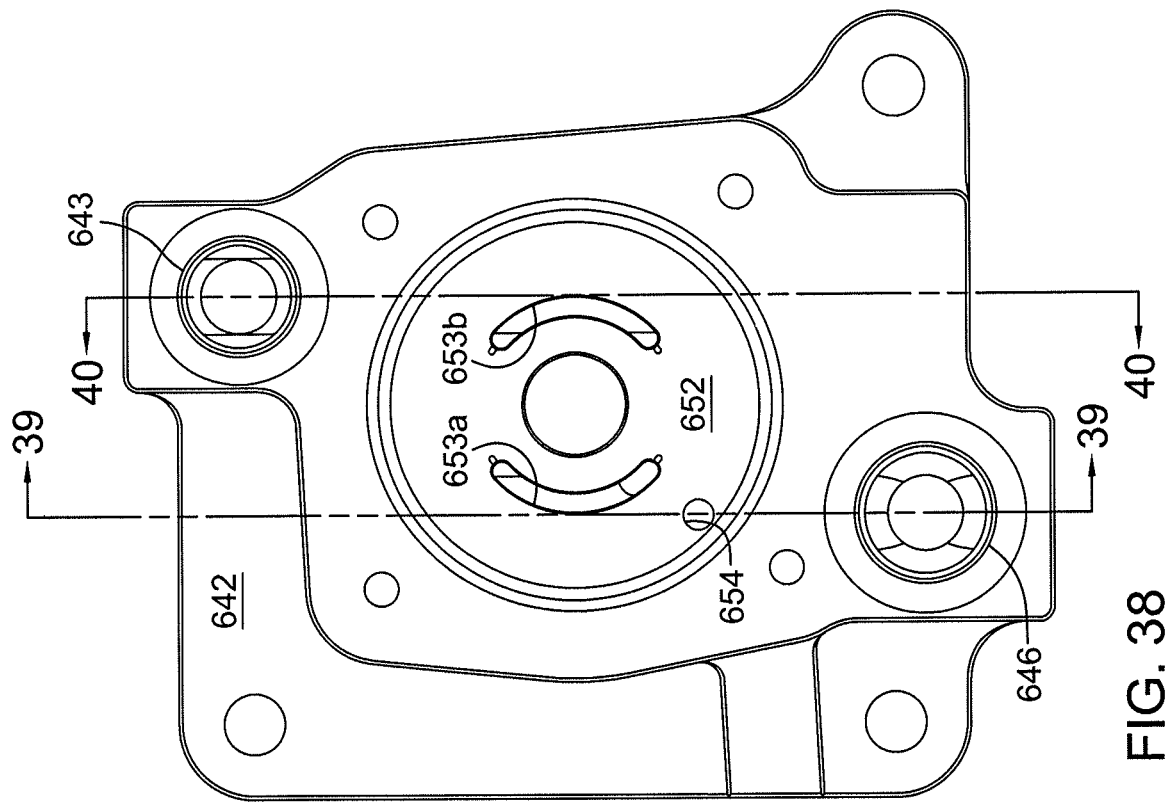
FIG. 38 is a top view of the auxiliary pump end cap of FIG. 36.
Figure 41:
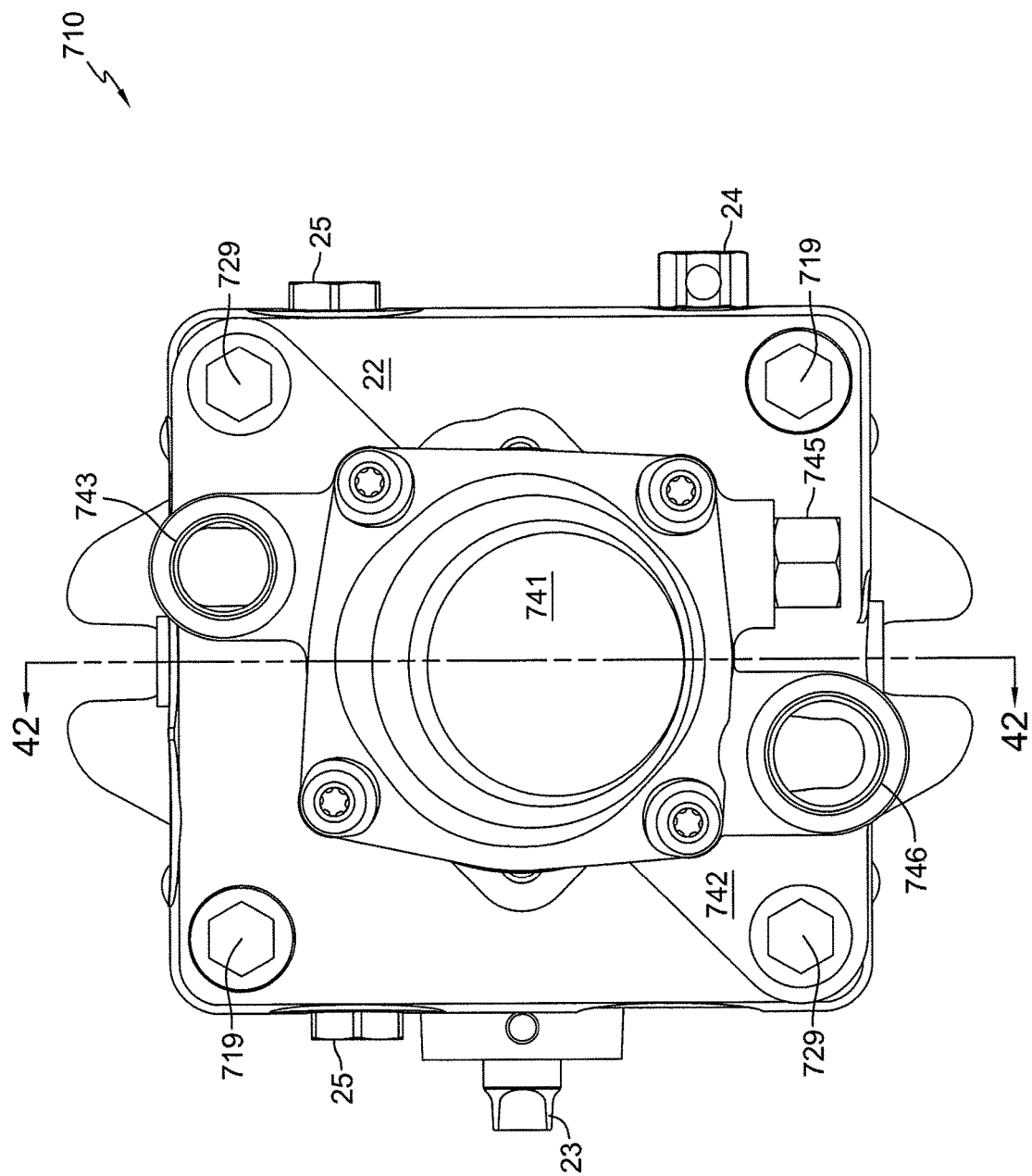
FIG. 41 is a top view of an eighth embodiment of a representative hydraulic pump assembly.
Figure 42:
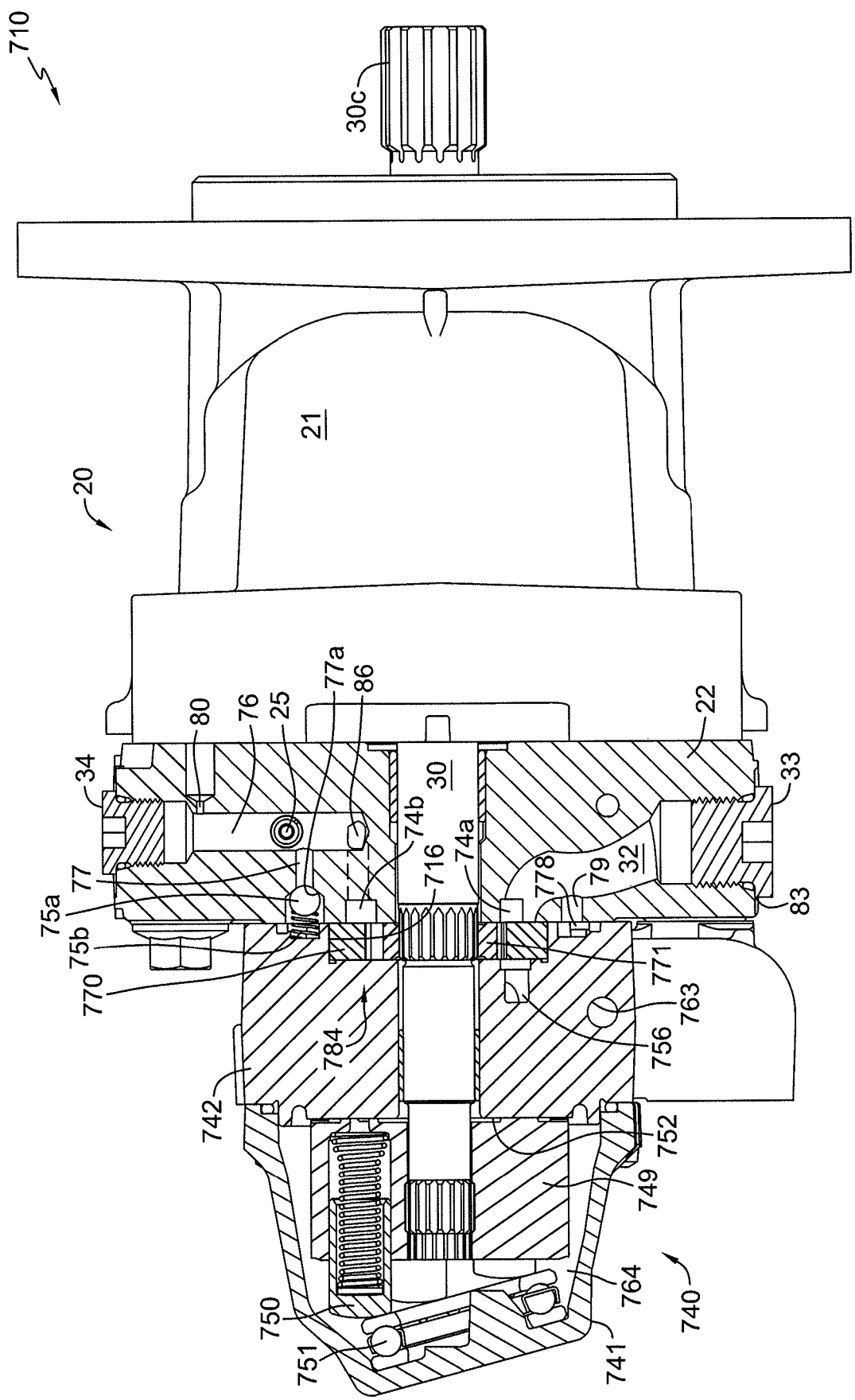
FIG. 42 is a partial section view of the hydraulic pump assembly of FIG. 41 along the line 42-42.
Figure 43:
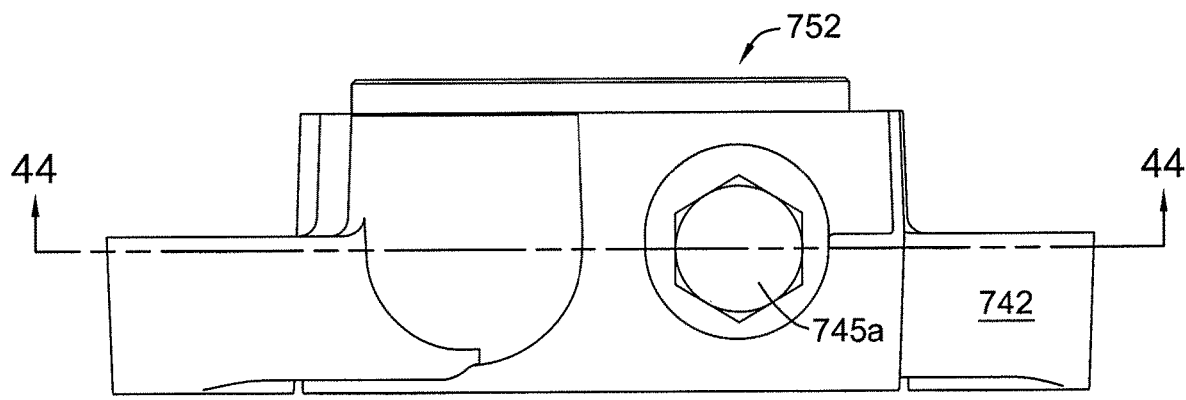
FIG. 43 is a side elevation view of the auxiliary pump end cap of the hydraulic pump assembly of FIG. 41.

In FIG. 33, a portion of main pump housing 21 has been cut away to reveal a sump 512 in fluid communication with drain passage 539 and, thereafter, drain port 538. This typical arrangement provides a pathway for accumulated hydraulic fluid from the main pump 520 to an external location (not shown), such as a reservoir used for cooling. Additional drain passage 566 places drain port 538 in communication with the interface between main pump end cap 522 and auxiliary pump end cap 542. Similarly, an additional drain passage 567 in auxiliary pump end cap 542 places auxiliary pump relief passage 561 in communication with the interface between main pump end cap 522 and auxiliary pump end cap 542. A tubular connector 568 joins the additional drain passages 566 and 567 to complete the pathway from auxiliary pump relief passage 561 to drain port 538. An integral, annular sealing feature 568a at each end of tubular connector 568 is pressed into the counterbore of each additional drain passage 566 and 567 upon assembly, sealing the pathway and eliminating a fluid restriction. It should be understood that other sealing methods known in the art, such as the use of a pair of o-rings with a straight bore connector, may also be used. When fluid pressure in auxiliary pump outlet passage 558 and auxiliary pump outlet bore 565 is sufficient to crack auxiliary pump relief valve 545, hydraulic fluid is relieved through drain port 538. FIG. 33 also depicts a perimeter seal 514 that seals main pump housing 21 against main pump end cap 522. Seal 514 may require a higher pressure rating than similar seals (not shown) employed in the other hydraulic pump assemblies illustrated herein. This change in seal rating is intended to counter any additional case pressure that may momentarily build in sump 512 when auxiliary pump relief valve 545 is opened.

To ensure the necessary vertical alignment of case drain port 538 and auxiliary pump relief passage 561, auxiliary pump outlet passage 558 and inlet passage 555 occupy a parallel configuration similar to that depicted in auxiliary pump end cap 242. However, as compared to the porting of auxiliary pump end cap 242, the positions of auxiliary pump outlet passage 558 and inlet passage 555 are reversed and also rotated 90 degrees clockwise about pump shaft 30 relative to main pump end cap 522. Auxiliary pump relief passage 561, in intermittent fluid communication with auxiliary pump outlet passage 558 and outlet bore 565, is generally disposed perpendicular thereto, and thus appropriately aligned relative to case drain port 538. To accommodate the relative rotation and juxtaposition of auxiliary pump outlet passage 558 and inlet passage 555, the porting on running surface 552 is rotated 90 degrees counterclockwise about pump shaft 30 relative to main pump end cap 522. Auxiliary pump housing 541 is similarly rotated to ensure that the appropriate displacement angle of thrust bearing 551 is maintained.

The versatility of the present invention is further illustrated by hydraulic pump assembly 510, wherein main pump housing 21 and trunnion arm 23 are rotated 180 degrees about pump shaft 30 relative to main pump end cap 522. This permits variability in the routing of control linkages to the main pump 520. From the above discussion, it should be understood that the variable arrangement of the ports and passages of the auxiliary pump end caps depicted herein demonstrates that the invention may be adapted to meet the constraints of a given application.

Similar to auxiliary pump 440, excess fluid build-up in auxiliary pump chamber 564 is directed to the auxiliary pump inlet passage 555 via auxiliary pump case drain 554. Such fluid is then available to feed auxiliary pump 540 by way of auxiliary pump arcuate port 553a or charge pump 584 via the charge pump arcuate port 556 located in pocket 516. The discharged fluid from auxiliary pump 540 exits auxiliary pump arcuate port 553b, traverses auxiliary pump outlet passage 558 and is available for external service via auxiliary pump outlet port 543. Hydraulic fluid returning from external service enters via auxiliary pump inlet port 546 and is once again directed to the auxiliary pump inlet passage 555. The discharged fluid from charge pump 584 exits charge pump arcuate port 574b and enters charge gallery 576. As previously described for hydraulic pump assembly 10, this charged fluid may be relieved through charge pump relief valve 75, utilized as make-up fluid by main pump 520 through check/relief valves 25, or bled to sump 512 via bleed passage 580.

A seventh representative hydraulic pump assembly 610 having auxiliary pump 640 assembled to a main pump 20 is depicted in FIGS. 34-40. The distinguishing features of auxiliary pump 640 and auxiliary pump end cap 642 are the vertically oriented auxiliary pump inlet port 646 and outlet port 643. Unlike the ports of the other auxiliary pump embodiments depicted herein, auxiliary pump inlet port 646 and outlet port 643 are formed on the horizontal face of end cap 642 adjacent auxiliary pump running surface 652. Consequently, inlet port 646 intersects auxiliary pump inlet passage 655, and outlet port 643 intersects auxiliary pump outlet passage 658, in a generally perpendicular orientation. Because of the machining required to completely form auxiliary pump inlet passage 655 and outlet passage 658, the openings remaining in the vertical faces of auxiliary pump end cap 642 are closed with threaded plugs 669a and 669b, respectively. As previously described for auxiliary pump end cap 542, the geometry of auxiliary pump end cap 642 is such that only three fasteners 629 are required to mate it to main pump end cap 22 and main pump housing 21, while a fourth, reduced-length fastener 619 completes the joining of main pump end cap 22 and main pump housing 21.

The structure and function of main pump 20 and main pump end cap 22 are as previously described for hydraulic pump assembly 10 and will not be further described herein. It should be noted that while main pump housing 21 and trunnion arm 23 are depicted in the same rotational orientation relative to main pump end cap 22 as previously described for hydraulic pump assembly 510, the orientation of these components in hydraulic pump assembly 610 could be that illustrated for the first five embodiments depending on the requirements of a given application.

The structure and function of elements of auxiliary pump 640 and its end cap 642 are substantially similar to those of the previously described auxiliary pumps and their respective end caps. For instance, auxiliary pump relief valve 645 recycles hydraulic fluid into the auxiliary pump inlet passage 655 via a recycle bore 663 in communication with auxiliary pump outlet passage 658. This is similar to the porting schemes depicted in auxiliary pump end caps 242, 342, and 442, respectively. And similar to auxiliary pumps 440 and 540, excess fluid build-up in the auxiliary pump chamber 664 is directed to the auxiliary pump inlet passage 655 via a case drain 654. Hydraulic fluid present in the auxiliary pump inlet passage 655 is then available to feed auxiliary pump 640 by way of auxiliary pump arcuate port 653a or to feed charge pump 684 via charge pump arcuate port 656 located in pocket 616. The discharge from auxiliary pump 640 exits auxiliary pump arcuate port 653b, traverses auxiliary pump outlet passage 658 and is available for external service via auxiliary pump outlet port 643. Hydraulic fluid returning from external service enters via auxiliary pump inlet port 646 and is once again directed to the auxiliary pump inlet passage 655. The discharged fluid from charge pump 684 exits charge pump arcuate port 74b and enters charge gallery 76. As previously described for hydraulic pump assembly 10, this charged fluid may be relieved through charge pump relief valve 75, utilized as make-up fluid by main pump 20 through check/relief valves 25, or bled to sump (not shown) via bleed passage 80.

The auxiliary pump inlet passage 655 and the auxiliary pump outlet passage 658 are generally aligned in parallel with each other and the main pump system passages 35 and 36. They are disposed on opposite sides of pump shaft 30. Auxiliary pump inlet passage 655 and auxiliary pump outlet bore 665 (an extension of auxiliary pump outlet passage 658) are intersected by auxiliary pump recycle bore 663 in a generally perpendicular orientation. The respective ports of auxiliary pump inlet passage 655 and outlet passage 658, i.e. auxiliary pump inlet port 646 and auxiliary pump outlet port 643, are located on opposite sides of auxiliary pump housing 641.

Auxiliary pump arcuate port 653a (inlet port) and arcuate port 653b (outlet port) on auxiliary pump running surface 652 are disposed in the opposite orientation as those arcuate ports of auxiliary pump running surface 552. Consequently, auxiliary pump housing 641 is rotated 180 degrees about the rotational axis of pump shaft 30 as compared to auxiliary pump housing 541. This is to ensure that the appropriate displacement angle of thrust bearing 651 is maintained.

An eighth representative hydraulic pump assembly 710 having auxiliary pump 740 assembled to a main pump 20 is depicted in FIGS. 41-44. The structure and function of main pump 20 and main pump end cap 22 is as previously described for hydraulic pump assembly 10 and will not be further described herein.

The structure and function of elements of auxiliary pump 740 and its end cap 742 are substantially similar to those of previously described auxiliary pump 640 and its respective end cap 642, and as such will not be detailed herein. The chief difference between auxiliary pumps 740 and 640 is the simplification of end cap 742 through the use of casting techniques, permitting auxiliary pump recycle bore 763, inlet passage 755, and outlet passage 758 to be integrally formed thereby without the need for a machined cross-passage which must then be plugged. As compared to auxiliary pump end cap 642, these casting techniques reduce the amount of material and machining necessary to form auxiliary pump end cap 742.

Auxiliary pump end cap 742 has a vertically oriented inlet port 746 and a vertically oriented outlet port 743. Inlet port 746 intersects auxiliary pump inlet passage 755, and outlet port 743 intersects auxiliary pump outlet passage 758, in a generally perpendicular orientation. Additionally, the geometry of auxiliary pump end cap 742 is such that it may be secured to main pump end cap 22 and main pump housing 21 by means of two threaded fasteners 729, rather than the three or four threaded fasteners required for the previous embodiments depicted herein. This represents a further reduction in the amount of material needed to form auxiliary pump end cap 742, and permits the use of two, reduced-length fasteners 719 to complete the joining of main pump end cap 22 and main pump housing 21.

Figure 45:
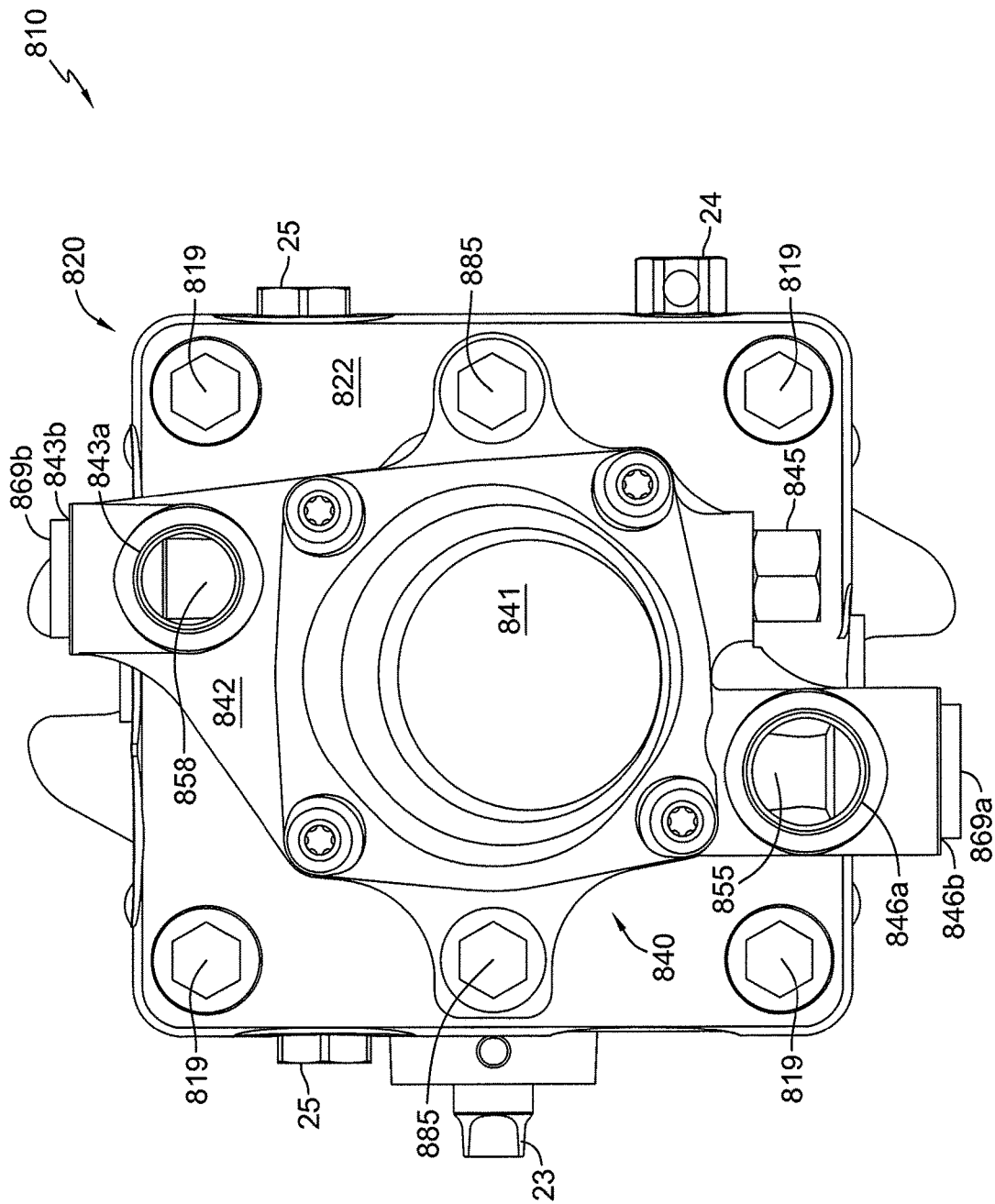
FIG. 45 is a top view of a ninth embodiment of a representative hydraulic pump assembly.
Figure 46:
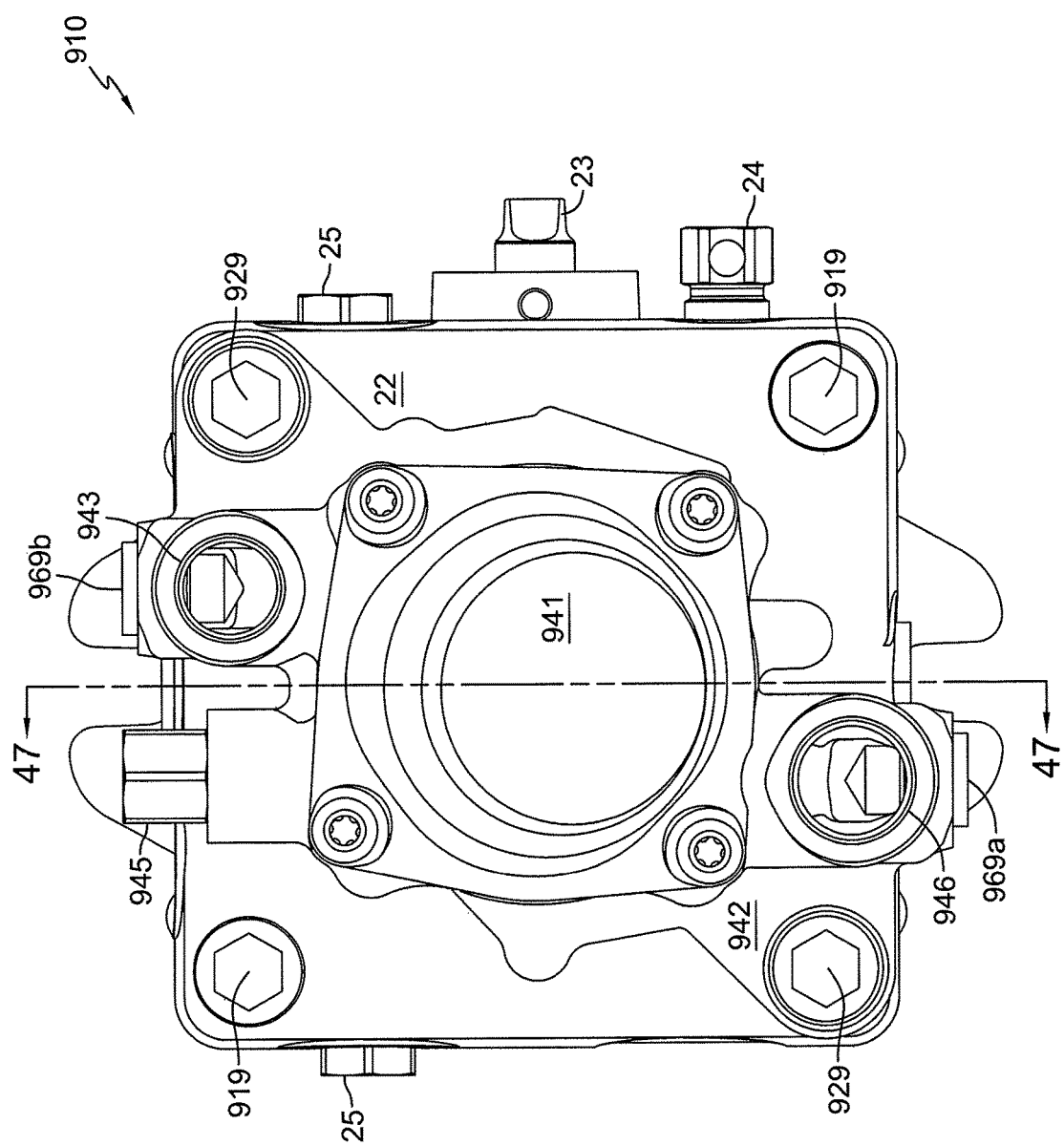
FIG. 46 is a top view of a tenth embodiment of a representative hydraulic pump assembly.
Figure 47:
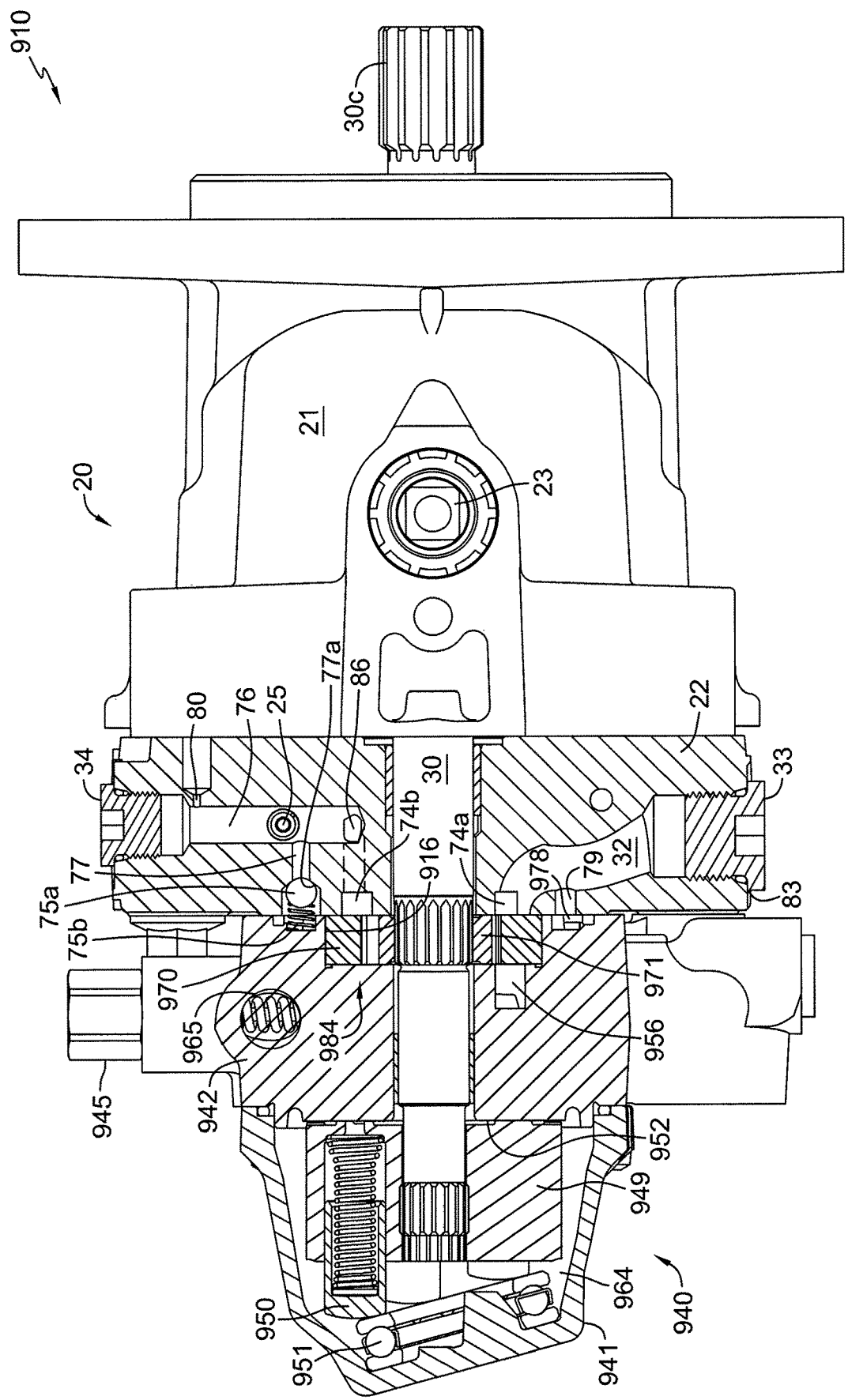
FIG. 47 is a partial section view of the hydraulic pump assembly of FIG. 46 along line 47-47.
Figure 48:
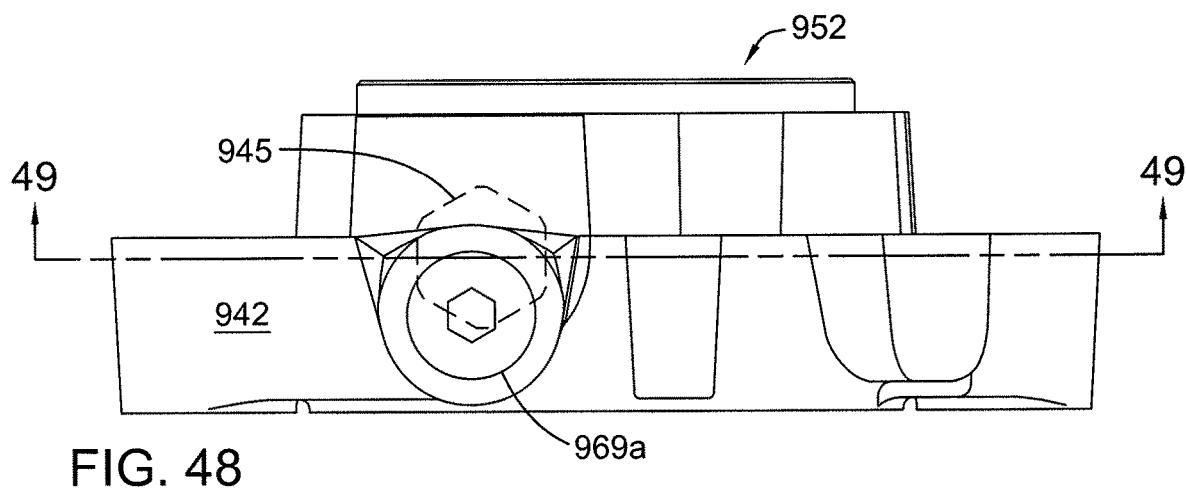
FIG. 48 is a side elevation view of the auxiliary pump end cap of the hydraulic pump assembly of FIG. 46.

A ninth representative hydraulic pump assembly 810 having a auxiliary pump 840 assembled to a main pump 820 is depicted in FIG. 45. The structure and function of elements of auxiliary pump 840 and its end cap 842 are substantially similar to those of previously described auxiliary pump 740 and its respective end cap 742, and as such will not be detailed herein. The distinguishing feature of auxiliary pump end cap 842 is the inclusion of both vertically and horizontally oriented inlet and outlet ports. Vertical inlet port 846a intersects auxiliary pump inlet passage 855, and vertical outlet port 843a intersects auxiliary pump outlet passage 858, in a generally perpendicular orientation. Additionally, auxiliary pump end cap 842 has a horizontally oriented inlet port 846b in line with auxiliary pump inlet passage 855, and a horizontally oriented outlet port 843b in line with auxiliary pump outlet passage 858. This feature adds versatility to the manner in which auxiliary pump 840 may be applied to a vehicle or other equipment, using either vertically or horizontally oriented fittings and hoses (not shown). The non-selected ports depicted in FIG. 45, horizontal inlet port 846b and horizontal outlet port 843b, may be sealed with threaded plugs 869a, 869b, respectively.

Another distinguishing feature of hydraulic pump assembly 810 is the use of two threaded fasteners 885 to attach auxiliary pump end cap 842 directly to main pump end cap 822, permitting main pump end cap 822 to be preassembled to main pump housing 21 with four, reduced-length fasteners 819. This configuration introduces more flexibility in the use of main pump 820, allowing it to be alternately fitted with either a simple gerotor charge pump and cover (not shown), or the present invention's auxiliary pump and embedded charge pump.

Other than the addition of two threaded bores (not shown) in main pump end cap 822 for receiving threaded fasteners 885, the structure and function of main pump 820 and main pump end cap 822 is as previously described for main pump 20 and main pump end cap 22, respectively, and will not be further described herein.

A tenth representative hydraulic pump assembly 910 having auxiliary pump 940 assembled to main pump 20 is depicted in FIGS. 46-49. The structure and function of main pump 20 and main pump end cap 22 can be as previously described for hydraulic pump assembly 10 and will not be further described herein.

The structure and function of elements of auxiliary pump 940 and its end cap 942 are substantially similar to those of previously described auxiliary pump 740 and its respective end cap 742 and as such will not be detailed herein. The chief differences between auxiliary pumps 940 and 740 are the structure of auxiliary pump relief valve 945 and the location of auxiliary relief valve port 960. Auxiliary pump relief valve 945 is a two-function valve of the type described in U.S. Pat. No. 6,719,005, the disclosure of which is incorporated herein by reference, but valve 945 does not have a bleed orifice in the valve seat 945c. In addition to its relief function, valve 945 incorporates a make-up fluid bypass function. In order to employ this two-function valve appropriately, auxiliary relief valve port 960 has been relocated to the opposite side of auxiliary pump end cap 942 as compared to, e.g., end cap 742. This orientation exposes the aft portion of valve 945 to the outlet or high pressure side of the auxiliary pump hydraulic circuit, and exposes the fore portion of valve 945 to the inlet pressure resident in auxiliary pump recycle passage 963.

Figure 49:
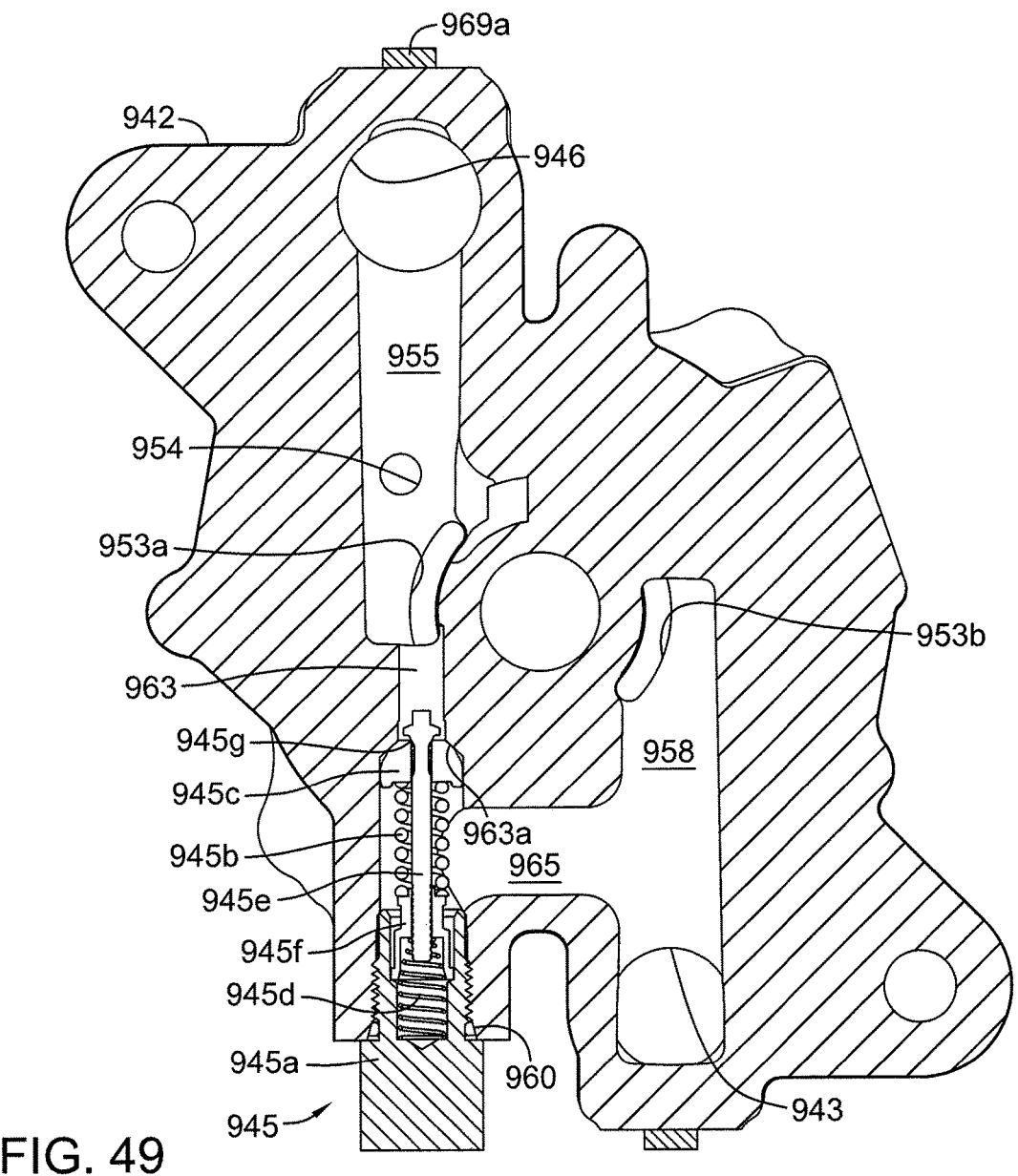
FIG. 49 is a section view of the end cap of FIG. 48 along line 49-49.

Referring to FIG. 49, the relief function of auxiliary pump relief valve 945 is engaged when the outlet pressure resident in auxiliary relief valve port 960 (and correspondingly present in auxiliary pump outlet bore 965 and auxiliary pump outlet passage 958) is of sufficient magnitude to act upon valve guide 945f and the rearmost portion of valve stem 945e to overcome the spring force of relief compression spring 945b and pressure resident in auxiliary pump inlet passage 955, thereby opening valve 945 in a first manner. This can be more simply described as the pressure in auxiliary pump outlet passage 958 exceeding a first set pressure. As a result, valve stem 945e is unseated from valve seat 945c and opens a pathway 945g between the high pressure and low pressure sides of the auxiliary pump hydraulic circuit. Hydraulic fluid is thus recycled to auxiliary pump inlet passage 955 via auxiliary pump recycle passage 963. Such high pressure situations may occur when the load on the auxiliary device increases unexpectedly.

Figure 50:
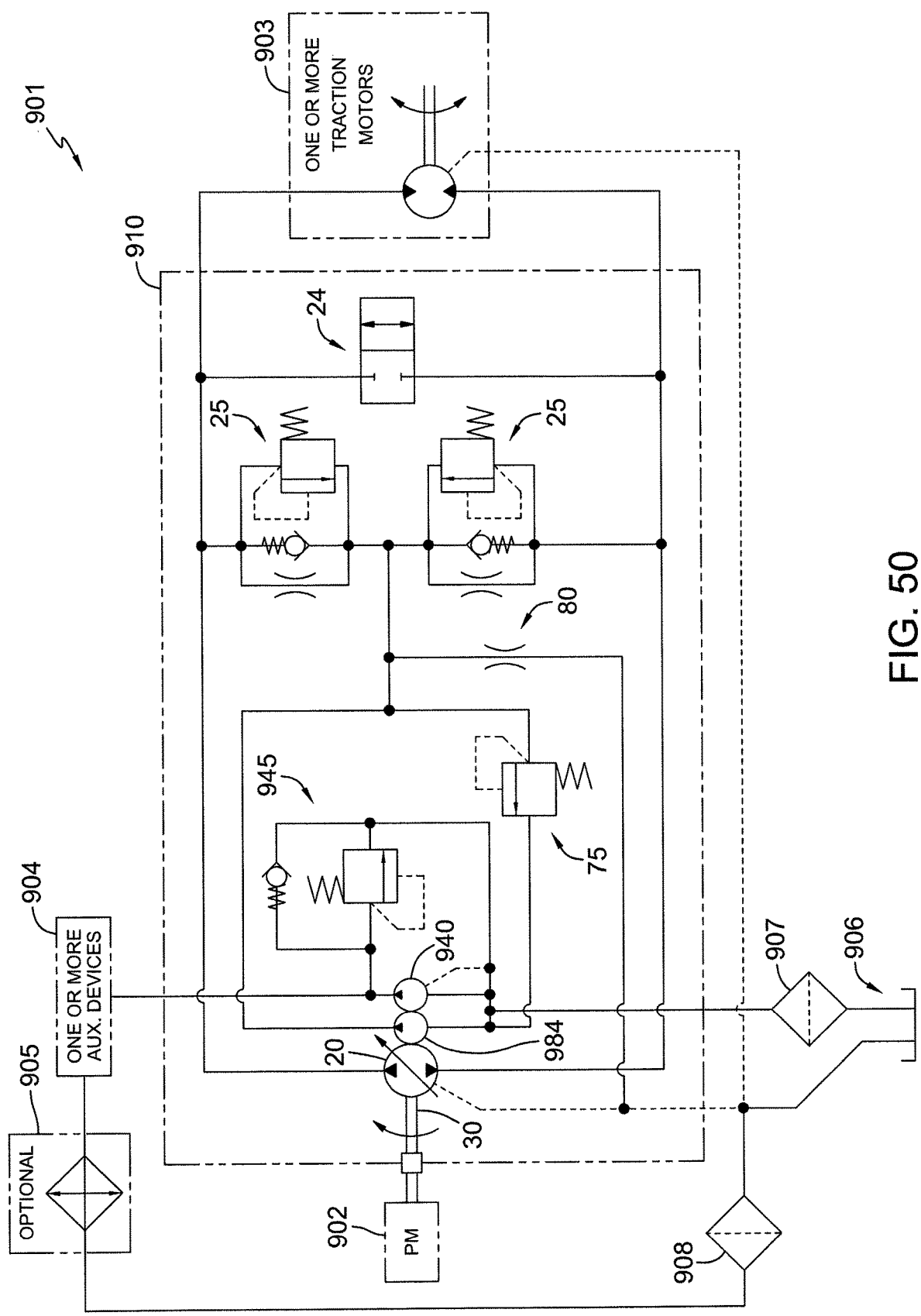
FIG. 50 is a schematic of a vehicle incorporating the tenth embodiment of the hydraulic pump assembly.

The make-up fluid bypass function of auxiliary pump relief valve 945 is best understood in the context of applying hydraulic pump assembly 910 to a vehicle having an auxiliary device, e.g. a lawn tractor having a mower deck lift. A vehicle 901 is shown schematically in FIG. 50 wherein hydraulic pump assembly 910 is driven by prime mover 902. It is to be understood that the vehicle 901 illustrated in FIG. 50 is but one of many applications for hydraulic pump assembly 910 in accordance with the principles of the invention. Hydraulic fluid is drawn from reservoir 906 through a mesh screen filter 907 to feed auxiliary pump 940 and charge pump 984. Main pump 20, whose closed-loop hydraulic circuit is maintained by charge pump 984, supplies hydraulic fluid to power one or more traction motors 903. Correspondingly, auxiliary pump 940 supplies hydraulic fluid to power one or more auxiliary devices 904. Hydraulic fluid powering the auxiliary devices 904 may circulate through an optional oil cooler 905 and filter 908 on its way back to reservoir 906, which also receives hydraulic fluid losses from main pump 20 and traction motors 903.

Figure 44:
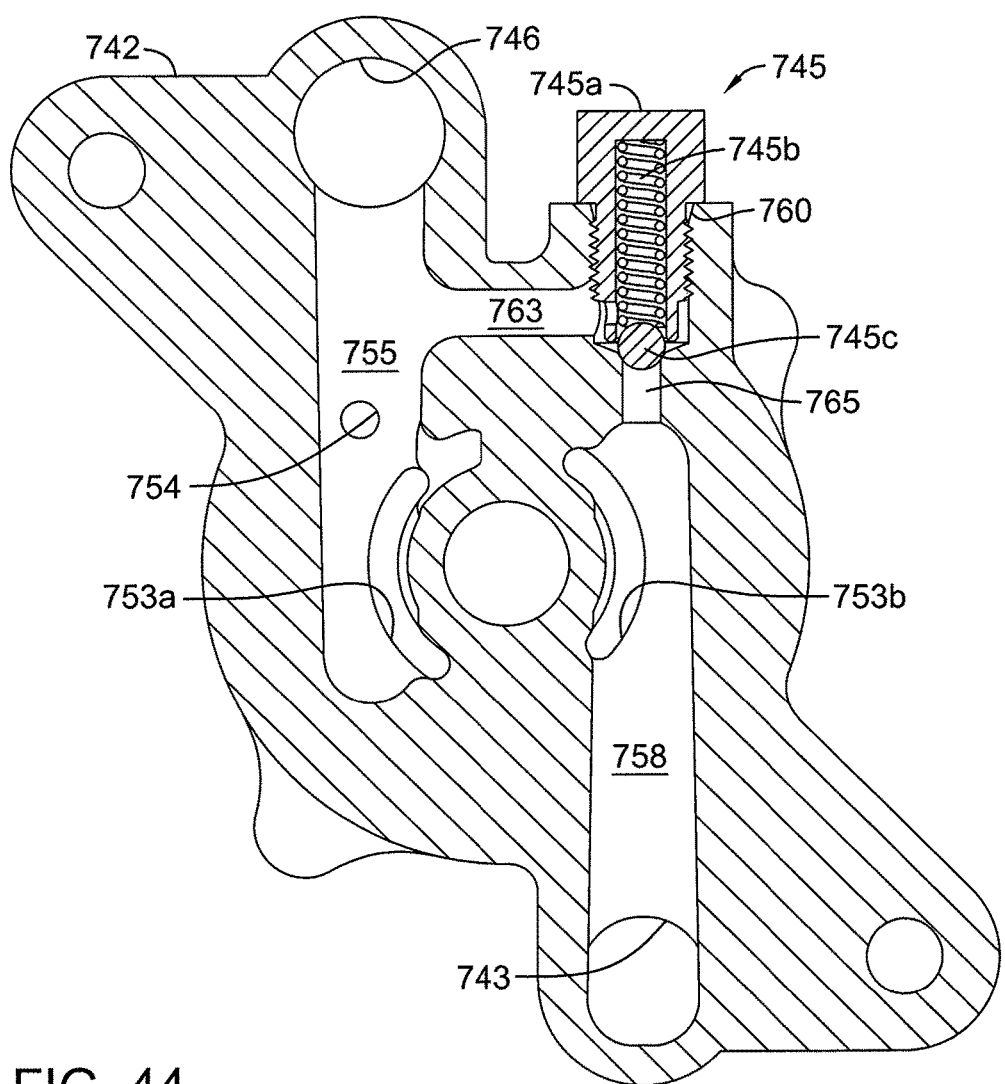
FIG. 44 is a section view of the end cap of FIG. 43 along the line 44-44.

If the auxiliary pump 940 is not being driven by prime mover 902 (i.e. vehicle 901 is shut down) and an operator wishes to return the auxiliary device 904 to its non-driven state or position (e.g., lower the mower deck to ground level), the operator's release of hydraulic fluid from the high pressure side of the auxiliary pump hydraulic circuit to reservoir 906 may create a relative vacuum or suction on the high pressure side of auxiliary pump 940. This can be problematic in that the auxiliary device's return to the non-driven state or position may not be fully accomplished or may be unnecessarily slowed. For example, in the case of end cap 742 as shown in FIG. 44, relief ball 745c would remain seated under the influence of the relative vacuum or suction. As a result, oil or possibly entrained air in auxiliary pump chamber 764 may be pulled through auxiliary pump 740 into the auxiliary pump hydraulic circuit. Upon resumption of operation, entrained air or the relative vacuum may lead to erratic performance of the auxiliary device.

The make-up fluid bypass function of valve 945 counteracts this situation. End cap 942 and valve 945 permit make-up fluid to be drawn from reservoir 906, to bypass auxiliary pump 940, and to replace the hydraulic fluid evacuated from the high pressure side of the auxiliary pump hydraulic circuit. Specifically, auxiliary pump relief valve 945 has a valve seat 945c disposed about one end of valve stem 945e. In its closed position, valve seat 945c prevents fluid communication between auxiliary pump recycle passage 963 and auxiliary pump outlet bore 965. However, in the case of a relative vacuum or suction present in auxiliary relief valve port 960 (and correspondingly present in auxiliary pump outlet bore 965 and auxiliary pump outlet passage 958), valve seat 945c will be unseated from the opening 963a to auxiliary pump recycle passage 963, under the influence of fluid pressure in passage 963 and in opposition to the relatively light spring force of bypass compression spring 945d, thereby opening valve 945 in a second manner. This can be more simply described as the pressure in auxiliary pump outlet passage 958 decreasing below a second set pressure. Thus, hydraulic fluid bypasses auxiliary pump 940 to fill the void created on the high pressure side of the auxiliary pump hydraulic circuit and improve performance.

While specific embodiments of the invention have been described in detail, it will be appreciated by those skilled in the art that various modifications and alternatives to those details could be developed in light of the overall teaching of the disclosure. Accordingly, the particular arrangements disclosed are meant to be illustrative only and not limiting as to the scope of the invention.

What is claimed is:

1. A hydraulic pump assembly, comprising:
   a first hydraulic porting member comprising a first face and a second face on opposite sides of the first hydraulic porting member, wherein the first face is engaged to a main pump housing to form a sump;
   a second hydraulic porting member comprising a third face and a fourth face on opposite sides of the second hydraulic porting member;
   a charge pump rotatably disposed on the second face;
   an auxiliary pump housing engaged to the fourth face to form an auxiliary pump chamber and an auxiliary pump located in the auxiliary pump chamber; and
   a charge pump relief valve located in a charge relief passage, and comprising a ball and a spring, wherein the spring is retained between a valve seat in the charge relief passage and the second hydraulic porting member.

2. A hydraulic pump assembly, comprising:
   a first hydraulic porting member joined to a second hydraulic porting member, the first hydraulic porting member comprising a pair of system ports;
   a primary pump engaged to a first side of the first hydraulic porting member;
   a charge pump disposed between the first hydraulic porting member and the second hydraulic porting member; and
   an auxiliary pump disposed on the second hydraulic porting member, the second hydraulic porting member, wherein the second hydraulic porting member comprises:
     an auxiliary inlet port connected to an auxiliary inlet passage and an auxiliary outlet port connected to an auxiliary outlet passage;
     a first arcuate port connecting the auxiliary pump to the auxiliary inlet passage and a second arcuate port connecting the auxiliary pump to the auxiliary outlet passage;
     an auxiliary relief valve disposed in an auxiliary relief port, wherein the auxiliary relief port is connected to the auxiliary outlet passage; and
     a recycle passage cast entirely within the second hydraulic porting member and connecting the auxiliary inlet passage to the auxiliary relief port.

3. The hydraulic pump assembly of claim 2, further comprising a case drain passage extending from the auxiliary inlet passage to an external surface of the second hydraulic porting member.

4. A hydraulic pump assembly, comprising:
   a first hydraulic porting member joined to a second hydraulic porting member;
   a primary pump engaged to a first side of the first hydraulic porting member, the first hydraulic porting member comprising a pair of system ports connected to a drive apparatus and to the primary pump;

a charge gallery hydraulically connected to the primary pump and sealed from any external access;

a charge pump disposed between the first hydraulic porting member and the second hydraulic porting member, wherein the charge pump receives hydraulic fluid from a charge pump inlet and provides charged hydraulic fluid to the charge gallery;

a charge relief passage hydraulically connected only between the charge gallery and the charge pump inlet; and an auxiliary pump disposed on the second hydraulic porting member, the second hydraulic porting member comprising an auxiliary inlet port connected to an auxiliary inlet passage, and an auxiliary outlet port connected to an auxiliary outlet passage, wherein the auxiliary inlet passage provides fluid to both the auxiliary pump and the charge pump.

5. The hydraulic pump assembly of claim 4, wherein the charge gallery is sealed from any external access by means of a port plug.

6. The hydraulic pump assembly of claim 4, further comprising a charge pump relief valve located in the charge relief passage, and comprising a ball and a spring, wherein the spring is retained between a valve seat in the charge relief passage and the second hydraulic porting member.

7. The hydraulic pump assembly of claim 4, wherein the primary pump, the charge pump and the auxiliary pump share a common axis of rotation.

8. The hydraulic pump assembly of claim 7, further comprising a single input shaft that is engaged to and drives the primary pump, the charge pump and the auxiliary pump.

9. The hydraulic pump assembly of claim 4, wherein the second hydraulic porting member further comprises:

a first arcuate port connecting the auxiliary pump to the auxiliary inlet passage and a second arcuate port connecting the auxiliary pump to the auxiliary outlet passage;

an auxiliary relief valve disposed in an auxiliary relief port, wherein the auxiliary relief port is connected to the auxiliary outlet passage; and a recycle passage connecting the auxiliary inlet passage to the auxiliary relief port.

10. The hydraulic pump assembly of claim 9, wherein the recycle passage is cast entirely within the second hydraulic porting member.

11. A hydraulic pump assembly use with a plurality of external hydraulic devices, the hydraulic pump assembly comprising:

a primary propulsion pump, a charge pump and an auxiliary pump, wherein the primary propulsion pump, the charge pump and the auxiliary pump share a common axis of rotation;

a pair of system ports connected to the primary propulsion pump and configured to be hydraulically connected to a first external hydraulic device;

an auxiliary output configured to be connected to a second external hydraulic device, whereby pressurized fluid may be transmitted from the auxiliary pump to the second external hydraulic device; and an auxiliary inlet configured to be connected to the second external hydraulic device, and fluidly connected to an auxiliary inlet passage, wherein the auxiliary inlet passage provides a source of fluid for both the auxiliary pump and the charge pump;

wherein the hydraulic pump assembly is configured such that the primary propulsion pump receives hydraulic fluid only from one of the pair of system ports and from the charge pump.

12. The hydraulic pump assembly of claim 11, further comprising a charge gallery disposed between and hydraulically connected to both the charge pump and the primary propulsion pump, wherein the charge pump provides hydraulic fluid to the charge gallery and the primary propulsion pump receives hydraulic fluid from the charge gallery.

13. The hydraulic pump assembly of claim 12, wherein the charge pump is disposed between the auxiliary pump and the primary propulsion pump.

14. The hydraulic pump assembly of claim 11, further comprising a single input shaft that is engaged to and drives the primary propulsion pump, the charge pump and the auxiliary pump.

15. The hydraulic pump assembly of claim 11, further comprising a charge relief passage, and a charge relief valve located in the charge relief passage, the charge relief valve comprising a ball and a spring.

* * * * *